US012526160B2

(12) United States Patent
Bosco et al.

(10) Patent No.: US 12,526,160 B2
(45) Date of Patent: Jan. 13, 2026

(54) KMS DEDICATED HSM DESIGN (CLAIMING OWNERSHIP)

(71) Applicant: Oracle International Corporation, Redwood Shores, CA (US)

(72) Inventors: Frederick Bosco, Portland, OR (US); Pankaj Bhandula, Redmond, WA (US); Ankit Goyal, Redmond, WA (US); Nitin Handa, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 18/662,434

(22) Filed: May 13, 2024

(65) Prior Publication Data

US 2024/0388448 A1 Nov. 21, 2024

Related U.S. Application Data

(60) Provisional application No. 63/466,907, filed on May 16, 2023.

(51) Int. Cl.
*H04L 29/06* (2006.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/0877* (2013.01); *H04L 9/3268* (2013.01)

(58) Field of Classification Search
CPC ................. H04L 9/3263; H04L 9/0825; H04L 9/0877; H04L 9/3268; H04L 9/0897
See application file for complete search history.

(56) References Cited

U.S. PATENT DOCUMENTS 10,680,816 B2 * 6/2020 Antoni .................... H04W 4/40
11,210,079 B2 * 12/2021 Fassino ................. H04L 63/123
(Continued)

FOREIGN PATENT DOCUMENTS

WO 2011006912 A1 1/2011
WO 2023187371 A1 10/2023

OTHER PUBLICATIONS

Creating an NTLS Connection Using a Self-Signed Appliance Certificate and a Client Certificate Signed by a Trusted Certificate Authority, Available Online at: https://thalesdocs.com/gphsm/luna/7/docs/network/Content/admin_partition/connections/ntls/CA-signed_client.htm, Accessed from Internet on Jan. 18, 2024, pp. 1-4.
(Continued)

*Primary Examiner* — Mahfuzur Rahman
(74) *Attorney, Agent, or Firm* — Kilpatrick Townsend & Stockton LLP

(57) ABSTRACT

A method may include receiving a request for a secure partition on an HSM from a client device and provisioning the secure partition on the HSM. The method may include generating a control server and a load balancer. The method may include generating, by a certificate service, a CSR signed by the certificate service. The method may include transmitting the CSR to the client device and receiving a first certificate including the public key of the first public private key pair and a private key of a second public private key pair. The method may include receiving a second certificate generated by an external certificate authority and signed with a public key of the second public private key pair. The method may include storing the first certificate and the second certificate on the secure partition in a location such that the second is accessible by the control server.

20 Claims, 16 Drawing Sheets

(56) References Cited

U.S. PATENT DOCUMENTS

| | | | |
|---|---|---|---|
| 2016/0359853 | A1 | 12/2016 | Fitzgerald et al. |
| 2017/0012774 | A1* | 1/2017 | Antoni ................ H04L 63/0485 |
| 2019/0140844 | A1* | 5/2019 | Brown ................ H04L 63/0428 |
| 2019/0253264 | A1* | 8/2019 | Singaravelu ............ H04L 41/28 |
| 2020/0021430 | A1 | 1/2020 | Grubin et al. |
| 2020/0186355 | A1* | 6/2020 | Davies .................. H04L 63/029 |
| 2020/0257827 | A1 | 8/2020 | Kounavis et al. |
| 2021/0067505 | A1* | 3/2021 | Gandhi ............... H04L 41/5067 |
| 2021/0344508 | A1 | 11/2021 | Dasen et al. |
| 2022/0166637 | A1 | 5/2022 | Keskikangas et al. |
| 2022/0353073 | A1 | 11/2022 | Nguyen |
| 2022/0376929 | A1 | 11/2022 | Nagaratnam et al. |
| 2023/0239163 | A1 | 7/2023 | Liu et al. |
| 2023/0299979 | A1* | 9/2023 | Kushwaha ............ H04L 9/3247 713/168 |
| 2023/0394152 | A1 | 12/2023 | Sarkar |
| 2024/0388448 | A1* | 11/2024 | Bosco .................. H04L 9/0825 |
| 2024/0388451 | A1* | 11/2024 | Bosco .................. H04L 9/0897 |

OTHER PUBLICATIONS

FIPS 140-2 Level 3—Non-Proprietary Security Policy—NitroxIII CNN35XX-NFBE HSM Family, Available Online at: https://csrc.nist.gov/CSRC/media/projects/cryptographic-module-validation-program/documents/security-policies/140sp4218.pdf, Jun. 21, 2023, pp. 1-40.

HSM Partitions, Available Online at: https://thalesdocs.com/gphsm/luna/6.3/docs/usb/Content/administration/partitions/hsm_partitions.htm, Accessed from Internet on Jan. 17, 2024, 1 page.

IBM Cloud HSM, Available Online at: https://developers.cloudflare.com/ssl/keyless-ssl/hardware-security-modules/ibm-cloud-hsm/, Accessed from Internet on Jan. 17, 2024, pp. 1-4.

Initialize the Cluster, Available Online at: https://docs.aws.amazon.com/cloudhsm/latest/userguide/initialize-cluster.html, 2024, 4 pages.

Integrate Managed HSM with Azure Private Link, Configure Azure Key Vault Managed HSM with Private Endpoints, Microsoft Learn, Available Online at: https://learn.microsoft.com/en-us/azure/key-vault/managed-hsm/private-link, Nov. 16, 2022, pp. 1-5.

Key Sovereignty, Availability, Performance, and Scalability in Managed HSM, Available Online at: https://learn.microsoft.com/en-us/azure/key-vault/managed-hsm/managed-hsm-technical-details, Aug. 3, 2023, 4 pages.

Ownership of Application Partitions, Available Online at: https://thalesdocs.com/gphsm/luna/6.3/docs/network/Content/overview/product_line/ownership_of_partitions.htm, Accessed from Internet on Jan. 17, 2024, pp. 1-3.

Patentability Search Report mailed on Jan. 18, 2024, 10 pages.

Patentability Search Report mailed on Jan. 17, 2024, 11 pages.

Using Hardware Security Modules with CredHub, Available Online at: https://docs.vmware.com/en/VMware-Tanzu-Application-Service/5.0/tas-for-vms/hsm-config.html, Jan. 16, 2024, pp. 1-7.

Using HSM-based Secrets Encryption, Version 1.28, GKE on VMware, Available Online at: https://cloud.google.com/anthos/clusters/docs/on-prem/latest/how-to/hsm-secrets-encryption, Accessed from Internet on Jan. 18, 2024, pp. 1-3.

Chen, Proposal: Istio Envoy mTLS Private Key Protection with HSM, Issue #36296, GitHub, Available Online at: https://github.com/istio/istio/issues/36296, Nov. 30, 2021, 6 pages.

Roy, Understanding and Generating Certificate Signing Requests (CSRs) Using Luna Cloud HSM—A Comprehensive Guide, Available Online at: https://www.encryptionconsulting.com/understanding-and-generating-certificate-signing-requests-csrs-using-luna-cloud-hsm-a-comprehensive-guide/, Jun. 22, 2023, 12 pages.

U.S. Appl. No. 18/662,429, Notice of Allowance, Mailed On Aug. 26, 2025, 9 pages.

* cited by examiner

KMS DEDICATED HSM DESIGN (CLAIMING OWNERSHIP)

CROSS-REFERENCES TO RELATED APPLICATIONS

This application claims the benefit of U.S. Provisional Application No. 63/466,907, filed on May 16, 2023, which is incorporated by reference.

BACKGROUND

Tenants of a cloud services provider may access secure resources to store data, keys, and other information in such a way that only authorized parties may access the stored resources. However, some of the secure resources may be controlled and/or managed by the cloud services provider. The information may therefore be accessed and/or observed by the cloud services provider. Thus, there is a need to develop methods and systems to prevent access of secure information on secure cloud-based resources by the cloud services provider.

BRIEF SUMMARY

A method may include receiving, by a hardware security module (HSM) service of a computing system, a request for a secure partition on an HSM from a client device. The method may include provisioning, by the HSM service of the computing system, the secure partition on the HSM. The method may include generating, by the HSM service of the computing system, a control server and a load balancer, each configured to provide access to the secure partition on the HSM to the client device. The method may include generating, by a certificate service executed on the secure partition on the HSM associated with the computing system, a certificate signing request (CSR), the CSR signed by the certificate service using a public key of a first public private key pair. The method may include transmitting, by the certificate service of the secure partition on the HSM associated with the computing system, the CSR to the client device. The method may include receiving, from the client device and by the certificate service of the secure partition, a first certificate. The first certificate may include the public key of the first public private key pair and a private key of a second public private key pair. The method may include receiving, by the certificate service of the secure partition, a second certificate generated by an external certificate authority and signed with a public key of the second public private key pair. The method may include storing, by the certificate service of the secure partition, the first certificate and the second certificate on the secure partition. The method may include storing, by the computing system, the second certificate in a location accessible by the control server.

In some embodiments, the computing system and/or the HSM service may be unable to access the secure partition after generating the control server. In some embodiments, the HSM may include a plurality of partitions. The method may then include generating, by the HSM service of the computing system, one or more replicas of the secure partition on one or more other HSMs. The method may include configuring, by the HSM service of the computing system, the control server and load balancer to provide access to at least one of the one or more replicas of the secure partition. The second public private key pair is associated with the client device. The load balancer is accessible by a public IP address.

A system may include one or more processors and a computer-readable medium may including instructions that, when executed by the one or more processors cause the system to perform operations. According to the operations, the system may receive, by a hardware security module (HSM) service of a computing system, a request for a secure partition on an HSM from a client device. The system may provision, by the HSM service of the computing system, the secure partition on an HSM associated with the computing system. The system may generate, by the HSM service of the computing system, a control server and a load balancer, each configured to provide access to the secure partition on the HSM to the client device. The system may generate, by a certificate module executed on the secure partition, a certificate signing request (CSR), the CSR signed by the certificate module using a public key of a first public private key pair. The system may transmit, by the certificate module of the secure partition, the CSR to the client device. The system may receive, from the client device and by the certificate module of the secure partition, a first certificate, the first certificate may include the public key of the first public private key pair and a private key of a second public private key pair. The system may receive, by the computing system, a second certificate generated by an external certificate authority and signed with a public key of the second public private key pair. The system may store, by the certificate module of the secure partition, the first certificate and the second certificate on the secure partition. The system may store, by the computing system, the first certificate in a location accessible by the control server.

In some embodiments, the computing system and/or the HSM service is unable to access the secure partition after generating the control server. The HSM may include a plurality of partitions. The second public private key pair may be associated with the client device. The load balancer may be only accessible by the client device.

A non-transitory computer-readable memory may include instructions that, when executed by one or more processors, cause the one or more processors to perform operations. The operations may include The non-transitory computer-readable memory may include receiving, by a hardware security module (HSM) service of a computing system, a request for a secure partition on an HSM from a client device. The method may include provisioning, by the HSM service of the computing system, the secure partition on the HSM. The method may include generating, by the HSM service of the computing system, a control server and a load balancer, each configured to provide access to the secure partition on the HSM to the client device. The method may include generating, by a certificate service executed on the secure partition on the HSM associated with the computing system, a certificate signing request (CSR), the CSR signed by the certificate service using a public key of a first public private key pair. The method may include transmitting, by the certificate service of the secure partition on the HSM associated with the computing system, the CSR to the client device. The method may include receiving, from the client device and by the certificate service of the secure partition, a first certificate. The first certificate may include the public key of the first public private key pair and a private key of a second public private key pair. The method may include receiving, by the certificate service of the secure partition, a second certificate generated by an external certificate authority and signed with a public key of the second public private key pair. The method may include storing, by the certificate service of the secure partition, the first certificate and the second certificate on the secure partition. The method may include storing, by the computing system, the second certificate in a location accessible by the control server.

BRIEF DESCRIPTION OF THE DRAWINGS

FIGS. 3E-3G illustrates a system for providing secure access to a secure partition, according to certain embodiments.

DETAILED DESCRIPTION

Figure 1:
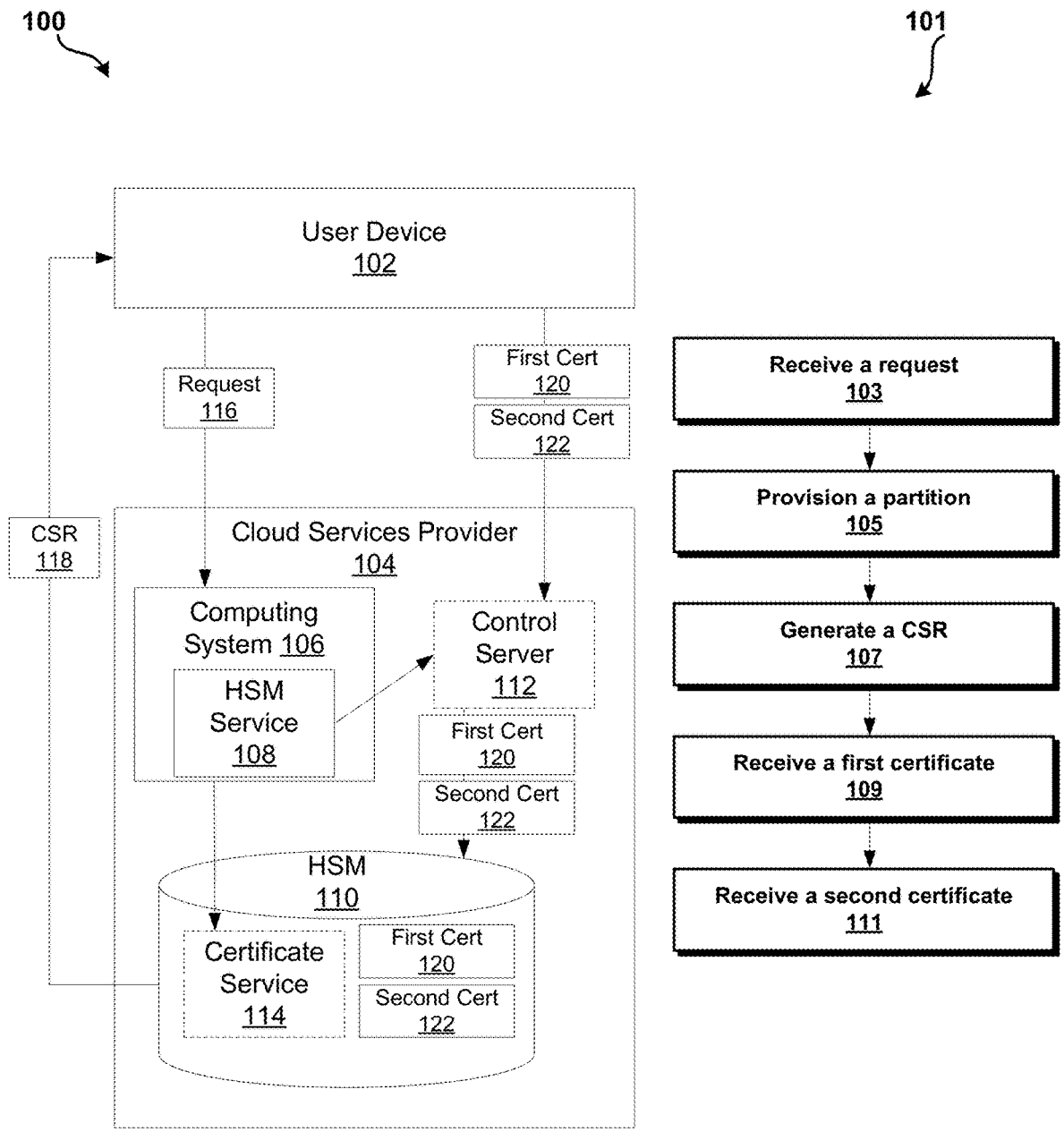
FIG. 1 illustrates a system and a process for provisioning and provisioning ownership to an HSM partition, according to certain embodiments.

Cloud-based computing solutions have created efficiencies in providing a computing system to multiple users within an organization, where effectively the computing system is the same for all of the users. Tasks like updating the computing system may be performed more efficiently as, instead of updating multiple machines in various locations, a centrally managed cloud-based computing system may be updated for all users. Also, the security of the computing system may be easier to manage than multiple systems-several deployed computing systems or machines may expose the systems to more risk than a centrally managed computing system. However, many organizations do not administer their own cloud-based computing systems, relying instead on cloud providers to provide those services for the organizations. The cloud services provider (CSP) hosts the organization's systems on the CSP's infrastructure.

Because the CSP may provide access to the CSP's cloud computing infrastructure, the CSP may be involved in authenticating users prior to accessing the organization's cloud resources. For some organizations and/or data types, the CSP's involvement and potential access to the organization's authentication and security mechanisms (e.g., passwords, keys, etc.) may not pose an issue. Some organizations may require more security, however, whether because of the sensitivity of the data, regulatory standards, or other reasons. For example, some organizations may desire a secure cloud-based platform where the CSP has no control over the cloud-based platform, instead managing their own access.

For example, security conscious organizations may wish to manage security keys, used to encrypt and decrypt data within their cloud-based resources (sometimes, a "tenancy") and/or other resources. A Hardware Security Module (HSM) partition or similar infrastructure may be provided by the CSP in order to securely hold the organization's keys and other data. The keys on the HSM may then be used to access data on the organization's other resources. If the organization does not control the HSM partition, then there may be a lack of trust by the organization, meaning that the organization cannot guarantee that the CSP cannot access the keys on the HSM partition. The lack of trust may be because CSP can access the organization's keys due to OCI's control of the infrastructure, or because governmental requirements may force exposure of the data using organization-stored keys.

When organizations perform operations on the keys stored on their HSM partition, the operation may utilize multiple modules and services, such as application programming interfaces (APIs), load balancers, identity management services, key management services, etc. These modules may intercept data associated with requests coming from the organization to access these keys. In order to provide an HSM partition, the CSP may control the HSM partition initially, as the HSM is part of the CSP's cloud-based infrastructure. The CSP may first have to provision the HSM partition, then have an organization claim ownership of the HSM partition. In the process, the CSP may sever any control or access to the HSM partition by the CSP in the future, ensuring that only the organization (or users associated therewith) may access the HSM partition.

One solution may be to provision an HSM partition for an organization, then provide a mechanism for the organization to be its own source of truth, removing the CSP from authentication responsibilities. An HSM service of the CSP may receive a request for a secure HSM partition from a user device associated with the organization. The CSP may then provision the HSM partition with requested services, modules, and other data, per the request. Then, the HSM service may generate a control server and/or load balancers associated with the user device and/or the HSM partition. A certificate module hosted on the HSM partition may then generate a certificate signing request (CSR), signed with the private (or secret) key of a first public-private key pair (HSM key pair).

The user device may then generate (or access) a second public private key pair (admin key pair) and a user certificate. The user certificate may be issued by a third-party, a self-issued certificate (i.e., user device issued), or some other certificate authority. Importantly, the CSP may not issue or access the user certificate. Then, using the public key of the admin key pair, the user device may sign the user certificate, generating a Partition Owner Trust Anchor Certificate (POTAC). Because the POTAC may not be generated using any resources and/or data from the CSP, the user device (i.e., the organization) may be its own source of truth. In other words, the POTAC may allow the CSP to be uninvolved in authenticating users to access the HSM partition—that responsibility may now rest with the organization.

The HSM service may transmit the CSR to the user device. The user device may then sign the CSR with the secret key of the admin key pair. The CSR, signed with the secret keys of the HSM and user key pairs (e.g., the POTAC), may then become a Partition Owner Authentication Certificate (POAC). The POTAC and the POAC may be stored on the HSM partition by the certificate service. The POTAC may additionally be stored on the control server (and/or somewhere accessible by the control server). While the control server may access the POTAC, no component controlled by the CSP may access the admin key pair, thus the POTAC and/or the POAC may only be verified by the user device. Access may only be granted to the HSM partition after authentication using the POAC and/or the POTAC. In other words, the CSP may no longer have any access to the HSM partition, nor any control in granting access to the HSM partition.

To provide access to the HSM partition, one solution may be to authenticate a user using the POTAC, and establishing layered transport layer security (TLS) connections to provide access to the HSM partition. The user may generate a third public-private key pair (user key pair). Using the public key of the user key pair, the user may request a leaf certificate from the user device. The user device may then sign the request using the secret key of the admin key pair and/or the POTAC. The user may then establish a first TLS connection to the control server of the CSP and provide the leaf certificate. Because the control server may access the POTAC, and the leaf certificate may be signed with the POTAC, the control server may use the POTAC as a certificate authority and validate that the leaf certificate is valid (e.g., the user may access the HSM partition). A second TLS connection to the HSM partition may be established within the first TLS connection. The user may then transmit the leaf certificate to the certificate module on the HSM partition, where the leaf certificate is verified using the POAC. Data may then be securely transmitted to and from the user and the HSM partition without any involvement by the CSP.

FIG. 1 illustrates a system 100 and a process 101 for provisioning and provisioning ownership to an HSM partition 110, according to certain embodiments. The system 100 may include a user device 102 and a cloud services provider (CSP) 104. The CSP 104 may include a computing system 106 with an HSM 108 and an HSM 110. The user device 102 may be physical or virtual machine(s) associated with an organization. For example, the user device 102 may be a laptop, server, desktop etc. Additionally or alternatively, the user device 102 may be a virtual machine in a private cloud network (PCN) associated with the organization. The PCN may be hosted by the CSP 104, by the organization, and/or by a third party. The CSP 104 may provide cloud services to one or more organizations (e.g., customers, tenants, etc.). The CSP 104 may provide virtual machines, cloud environments, PCNs, cloud-based storage, and other such cloud resources.

The computing system 106 may be any number of physical and/or virtual machines, configured to provide various services to tenants of the CSP 104. The services may include identity services, key management services, provisioning of cloud resources, processing solutions, application instantiation, and/or other cloud service. One such service may be the HSM service 108. The HSM service 108 may include one or more application programming interfaces (APIs) configured to provide access to and manage HSM partitions. For example, the HSM service 108 may identify available partitions on an HSM and provision an available HSM partition for use by a tenant (e.g., the user device 102). The HSM service 108 may cause one or more services to be instantiated on the HSM partition, such as a certificate service 114. The HSM service 108 may also transmit and receive data from the user device 102 and the HSM 110 as part of the provisioning service.

The HSM 110 may be a hardware and/or software component configured to provide a secure environment to the user device 102. The HSM 110 may be a PCI-e card or other hardware component connected to a server or other physical machine. The HSM 110 may include one or more physical and/or logical partitions. Each partition may be inaccessible from any other partition of the HSM 110. Because of this, each partition may be "owned" by, or associated with, different tenants. While FIG. 1 only shows one HSM 110, it should be understood that any number of HSMs may be present, with any number of partitions. In some embodiments, a partition of the HSM 110 may be replicated on another partition of a separate HSM. Thus, the data on the partition may be duplicated, creating redundancies and providing more efficient to multiple users. The different HSMs (and partitions thereof) may therefore be used to provide secure access to data across regions, where each HSM is connected to a respective server in respective regions.

At 103, the computing system 106 of the CSP 104 may receive a request 116 for a secure HSM partition from the user device 102. The request may include a user ID, associated with a tenant of the CSP 104, one or more provisioning requests (e.g., desired applications, services, etc.), and other such information. The request 116 may be received by and/or otherwise provided to the HSM service 108. The computing system 106 may authenticate the user device 102 using some or all of the information included in the request 116. For example, the computing system 106 may verify the user ID against an identity service executed on the computing system 106 and/or another service of the CSP 104.

At 105, after authenticating the user device 102, the HSM service 108 may provision the secure partition on the HSM 110. Provisioning the secure partition may include instantiating a certificate service 114 on the HSM 110. The certificate service 114 may be configured to generate a public-private key pair (HSM keys), unique to the HSM 110. The certificate service 114 may also be configured to act as a certificate authority, managing and verifying certificates for subsequent access to the secure partition of the HSM 110. The HSM service 108 may also configure and/or provision a control server 112. The control server 112 may be a hardware and/or software component configured to manage connection(s) between the user device 102 and the HSM 110. The control server 112 may be physically and/or logically connected to a physical machine hosting the HSM 110. The control server 112 may be associated with the user device 102, meaning that the control server 112 only communicates with a single tenant. In some embodiments, the control server 112 may be associated with the secure partition of the HSM 110. If replica partitions are provisioned on other HSMs, each replica partition may have an associated control server.

At 107, the certificate service 114 may generate a certificate signing request (CSR) 118. The CSR 118 may be generated using the secret key of the HSM keys. The CSR 118 may then be transmitted to the user device 102. The CSR 118 may be transmitted to the user device 102 via the HSM service 108, directly from the HSM 110, and/or by some other service of the CSP 104.

The user device 102 may then access a second public-private key pair (the "admin keys"), The user device 102 may also access a first certificate 120. The first certificate 120 may be accessed from a third-party certificate authority and/or generated by the user device 102. The first certificate 120 may have no connection to the CSP 104 and/or any component or service thereof. Then, using the public key of the admin keys, the user device 102 may sign the first certificate 120. By signing the first certificate 120 with the public key of the admin keys, the first certificate 120 may become a Partition Owner Trust Anchor Certificate (POTAC). POTAC may have no connection to the CSP 104. Therefore, the POTAC 120 may be an external source of truth (with respect to the CSP 104). In other words, the POTAC 120 may be used to authenticate users to provide access to the secure partition without any credentialing by the CSP 104.

The user device 102 may also sign the CSR 118 with the POTAC 120 and the public key of the admin keys, generating a second certificate 122. The second certificate 122 may be referred to as the Partition Owner Authentication Certificate (POAC). The POAC 122 because the POTAC 120 may be signed with the POTAC 120, the public key of the admin keys, and the CSR 118, the POAC 122 may be used to link the user device 102 (i.e., the tenant) to the secure partition on the HSM 110. The POAC 122 may be the only data with information associated with the HSM 110 (i.e., the CSR 118 including the secret key of the HSM keys) and the tenant (e.g., the POTAC 120).

At 109, the HSM 110 may store the POTAC 120. The POTAC 120 may be received via the HSM service 108, by the control server 112, and/or directly from the user device 102. The POTAC 120 may be stored by the certificate service 114 for subsequent access and/or verification. The POTAC 120 may also be stored by the control server 112. In some embodiments, the POTAC 120 may be stored on a memory of the control server 112 and/or may be stored in a separate memory, accessible by the control server 120. At 111, the HSM 110 may receive and store the POAC 122 on the secure partition of the HSM 110. After both the POTAC 120 and the POAC are stored on the HSM 110, the CSP 104 may no longer have any control over or access to the secure partition of the HSM 110. Subsequent authentication and access to the secure partition may be managed by the control server 112, which, while managed by the CSP 104, may only include the POTAC 120 as a means of authentication. This means that the control server 112 may only provide access via a credentialing authority provided by the tenant (e.g., the POTAC 120). As the control server 112 (nor any other component of the CSP 104) does not have access to the private key of the admin keys, there may be no way for the CSP 104 to access the secure partition of the HSM 110.

Figure 2:
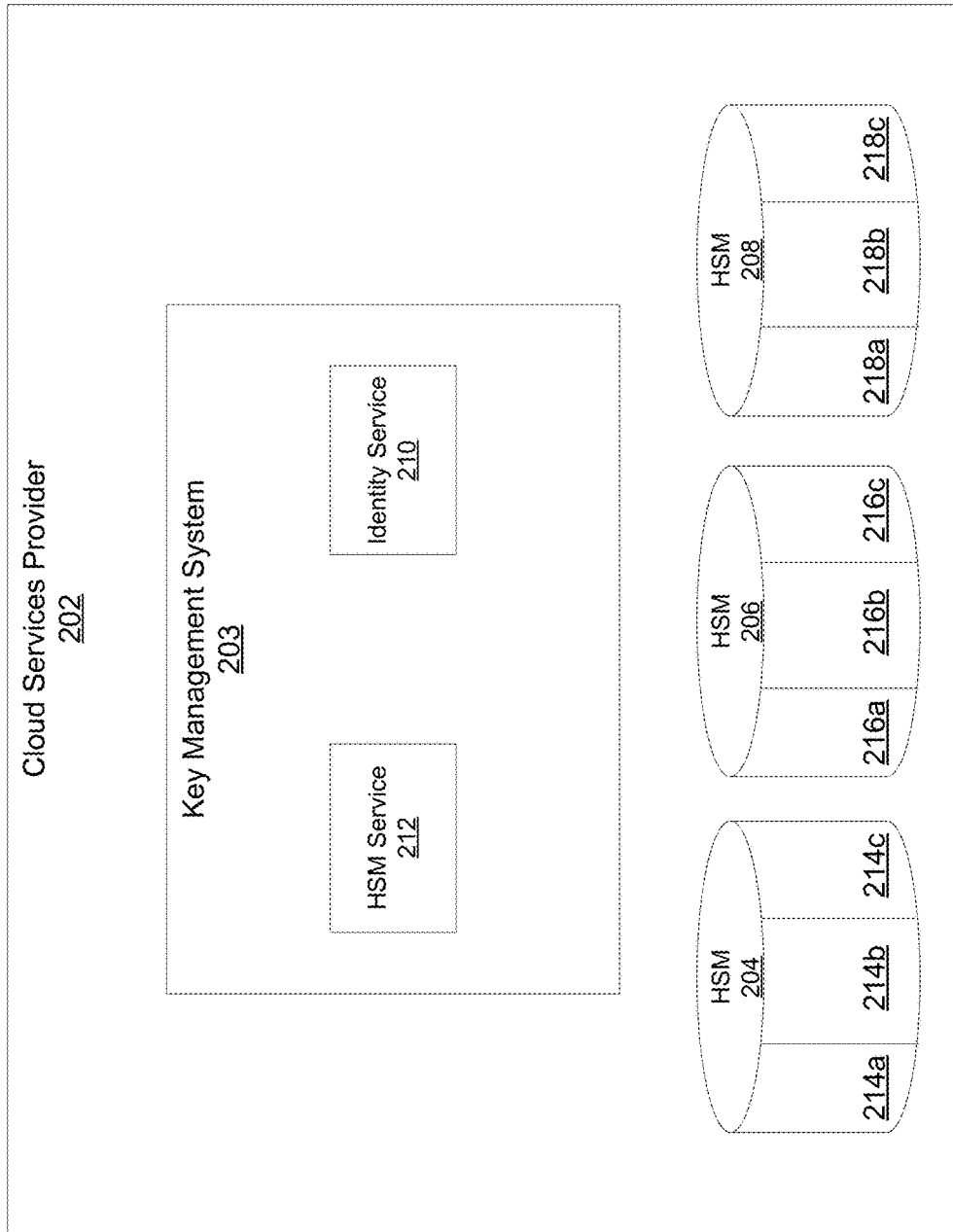
FIG. 2 illustrates a system for providing HSM partitions in a cloud environment, according to certain embodiments.

FIG. 2 illustrates a system 200 for providing HSM partitions in a cloud environment, according to certain embodiments. The system 200 may be similar to all or some of the system 100 in FIG. 1. The system 200 may include a CSP 202, with a key management system 203 and HSMs 204-208. The CSP 202 may provide cloud services to one or more organizations (e.g., customers, tenants, etc.). The CSP 202 may provide virtual machines, cloud environments, PCNs, cloud-based storage, and other such cloud resources. The key management system 203 may include one or more physical and/or virtual machines configured to provide and store keys to a tenant of the CSP 202. The key management system 203 may also include an identity service 210 and an HSM service 212. The identity service 210 may be used to authenticate a user to a key management environment and/or the HSMs 204-208. The identity service 210 may access one or more resources (e.g., databases etc.) of the CSP 202. In some embodiments, the identity service 210 may only access resources within the key management system 203. For example, a user may request access to the key management system 203 with a first set of credentials. The first set of credentials may be unique to the key management system 203. Then, the key management system 203 may access local resources (e.g., within the key management system 203) in order to authenticate the first set of credentials. One of ordinary skill in the art would recognize many different possibilities and configurations.

The HSM service 212 may be similar to the HSM service 108 in FIG. 1. The HSM service 212 may include one or more application programming interfaces (APIs) configured to provide access to and manage HSM partitions. For example, the HSM service 212 may identify available partitions on the HSM 204-208 and provision the available HSM partitions for use by a tenant. The HSM service 212 may cause one or more services to be instantiated on the HSM.

The HSMs 204-208 may be similar to the HSM 110. Each of the HSMs 204-208 may include one or more partitions. For example, the HSM 204 may include partitions 214a-c. The HSM 206 may include partitions 216a-c, and the HSM 208 may include partitions 218a-c. The partitions may be logical and/or physical partitions. Thus, each partition may be owned by a separate tenant. In some embodiments, a partition may be owned by a tenant, and replicated on other partitions on other HSMs. The HSM 204 may be in a first region, the HSM 206 may be in a second region, and the HSM 208 may be in a third region. A tenant may have tenancies with the CSP 202 in each of the regions and therefore wish to access keys and/or other data in each region. As the HSMs 204-208 may be hardware components, quarantined to improve security, each HSM 204-208 may only be accessed from within the respective region. Therefore, a partition on one HSM 204-208 may be replicated on partitions of the other HSMs 204-208. For example, the tenant may own the partition 214a on the HSM 204. The partitions 216a and 218a may then be provisioned identically to the partition 214a, enabling the tenant to access keys, data, etc. from each of the regions.

FIGS. 3A-3D illustrate a system 300 for provisioning and providing access to a secure partition 312, according to certain embodiments. The system 300 may be similar to the system 100 in FIG. 1 and/or the system 200 in FIG. 2. Similar components may have features and capabilities similar to those in FIGS. 1 and 2. The system 300 may be configured to perform some or all of the process 101. The system 300 may include a CSP 302, a client device 303, and an HSM 310. The CSP 302 may include a key management system (KMS) 304 with an HSM service 306 and an identity service 308. The HSM 310 may include the secure partition 312. The HSM 310 may include multiple partitions, although only the secure partition 312 is shown. The HSM 310 may be a hardware component (e.g., a PCI-e device), quarantined to improve security.

The client device 303 may be similar to the user device 102 in FIG. 1. The client device 303 may be physical or virtual machine(s) associated with an organization. For example, the client device 303 may be a laptop, server, desktop etc. Additionally or alternatively, the client device 303 may be a virtual machine in a virtual cloud network (PCN) associated with the organization. The PCN may be hosted by the CSP 302, by the organization, and/or by a third party. The client device 303 may transmit a request 320 to the CSP 302 and/or the KMS 304. The request 320 may include a provisioning command to provision a secure partition on an HSM (e.g., the secure partition 312). The request 320 may also include an identifier associated with the client device 303 and/or a user thereof. The request 320 may also indicate other regions in which to provision a partition. For example, the client device 303 and the HSM 310 may be associated with a first region, and the client device 303 may request a secure partition in a second region. Then, the request 320 may indicate the second region as needing a secure partition on an associated HSM (e.g., the HSM 208 in FIG. 2). The HSM service 306 may then begin a provisioning process for an HSM in the first and second regions.

The HSM service 306 may utilize some or all of the information in the request 320 to authenticate the client device 303. The HSM service 306 may communicate with the identity service 308 to authenticate the client device 303. The identity service 308 may verify credentials (e.g., a username and password) of the client device 303 in order to authorize the request 320. In some embodiments, the identity service 308 may verify the client device 303 for all regions. In other embodiments, the identity service 308 may only verify the client device 303 for a single region. Verification may be performed by other identity services for other regions.

After authenticating the client device 303, the HSM service 308 may create the secure partition 312 in the HSM 310. Creating the secure partition 312 may include designating a hardware partition (e.g., a single hardware component of the HSM 310) to be associated with the client device 303 (or a user thereof). Creating the secure partition 312 may additionally or alternatively include creating a logical partition within the HSM 310. Once the secure partition 312 is created, the HSM service 306 may cause one or more services to be instantiated on the secure partition 312 via a provisioning request 322. The provisioning request 322 may include one or more commands that cause one or more services, applications, and/or data sets to be instantiated or otherwise stored on the secure partition 312. The one or more services may include a certificate service 314. The certificate service 314 may be configured to access and manage certificates on the secure partition 312. The certificate service 314 (or another service on the secure partition 312) may also generate HSM keys 316. The HSM keys 316 may be a public-private key pair, including a public key (Pub(1)) and a secret key (Sec(1)).

The HSM service 306 may also cause a control server 324 to be provisioned. The control server 324 may be similar to the control server 112 in FIG. 1. The control server 324 may be a hardware and/or software component configured to manage connection(s) between the client device 303 and the HSM 310. The control server 324 may be physically and/or logically connected to a physical machine hosting the HSM 310. The control server 3224 may be associated with the client device 303, meaning that the control server 324 only communicates with a single tenant. In some embodiments, the control server 324 may be associated with the secure partition of the HSM 310. If replica partitions are provisioned on other HSMs, each replica partition may have an associated control server.

The HSM service 306 may also instantiate a load balancer (LB) 326. The LB 326 may be configured to direct traffic between the client device 303 (and/or other associated devices) and the secure partition 312. The LB 326 may be configured to transmit data via the control server 324. The LB 326 may be a private LB, with a non-discoverable IP address. Only the client device 303 (and/or other associated devices) may access the LB 326, limiting access and providing more security. Additionally or alternatively, the LB 326 may only be accessible via a private endpoint of a PCN associated with the client device 303. One of ordinary skill in the art would recognize many different possibilities and configurations.

Figure 3A:
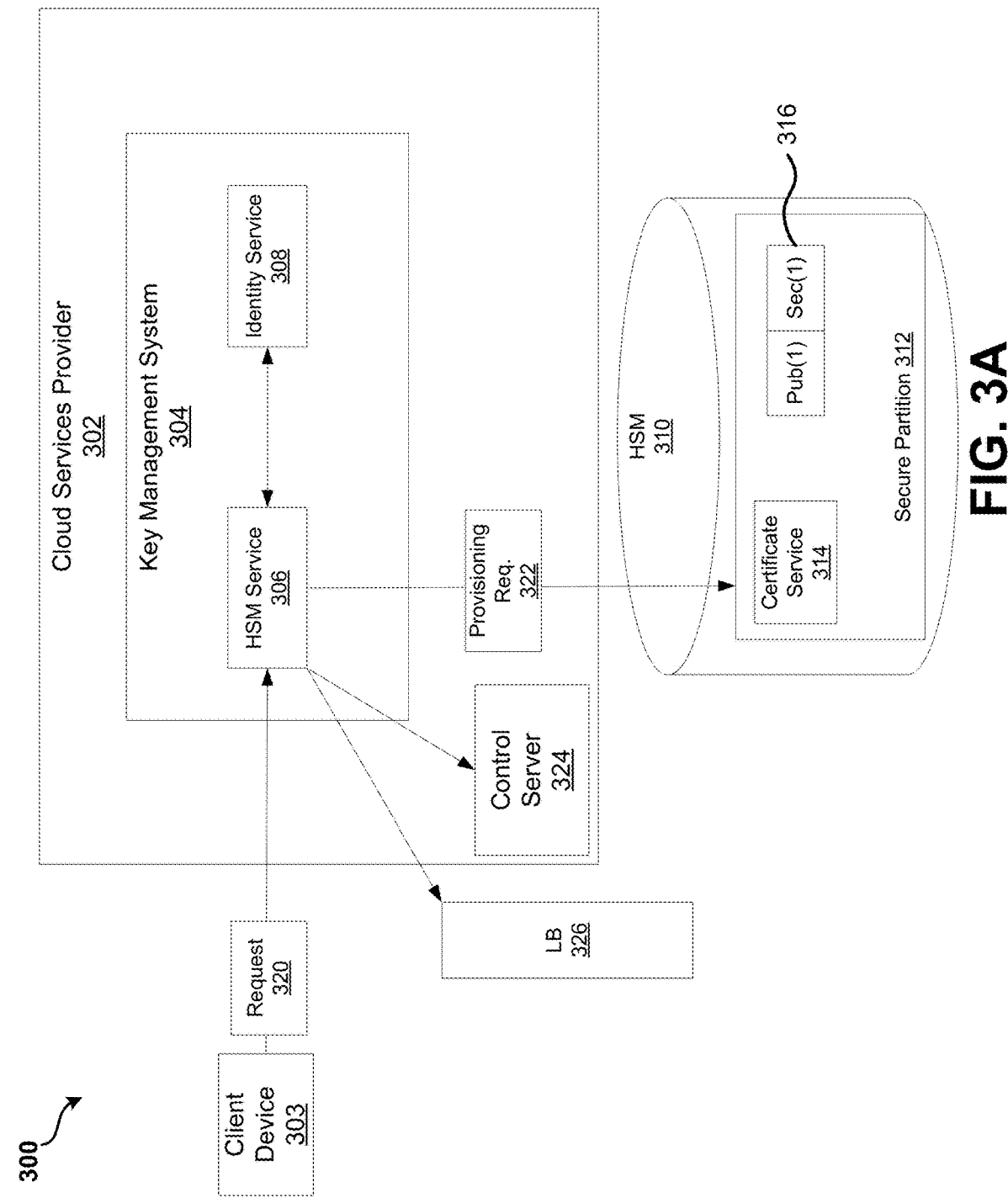
FIGS. 3A-3D illustrate a system for provisioning and providing access to a secure partition, according to certain embodiments.
Figure 3B:
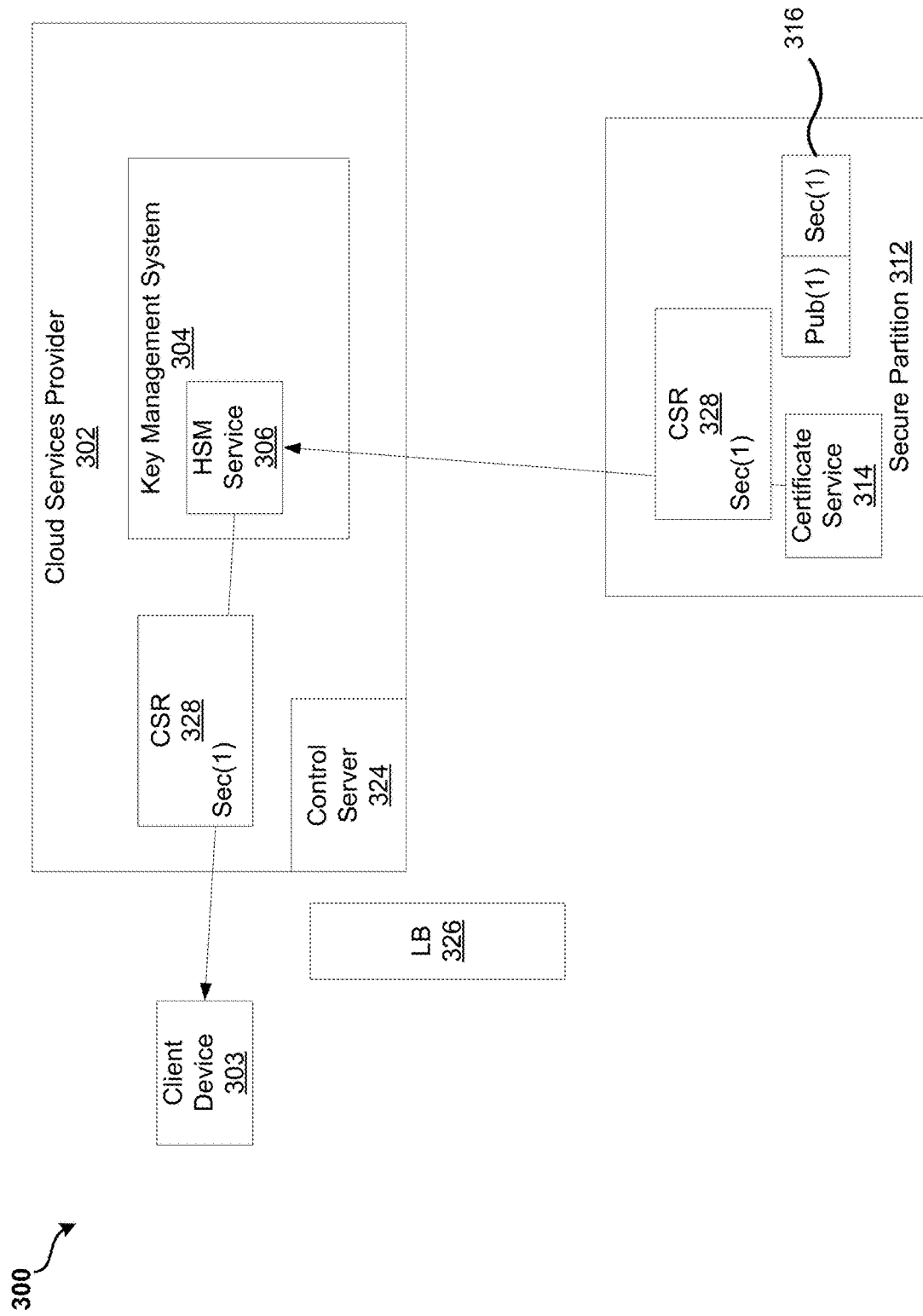

In FIG. 3B, the certificate service 314 may generate a CSR 328. The CSR 328 may be a request for a certificate used to authenticate the client device 303. The certificate service 314 may digitally sign the CSR 328 with the Sec(1) of the HSM keys 316. The CSR 328 may therefore be linked to the secure partition 312. However, even though the certificate service 314 was instantiated on the secure partition by the CSP 302, the CSP 302 has no access to the instance of the certificate service 314. The CSP 302 therefore may have no control or ability to verify a certificate signed user the HSM keys 316. In other words, even though the CSP 302 may control the HSM 310 and instantiate the certificate service 314, the CSP 302 may have no control over anything within the secure partition 312.

The CSR 328 may be transmitted to the client device 303. In the embodiment shown, the CSR 328 may be transmitted to the client device 303 via the HSM service 306. Because the client device 303 (or a user thereof) may not have claimed ownership of the secure partition yet, the LB 326 and/or the control server 324 may not transmit data to and from the client device 303 and the secure partition 312. Thus, the HSM service 306 (or some other service of the KMS 304 and/or the CSP 302) may transmit the CSR 328 to the client device 303.

Figure 3C:
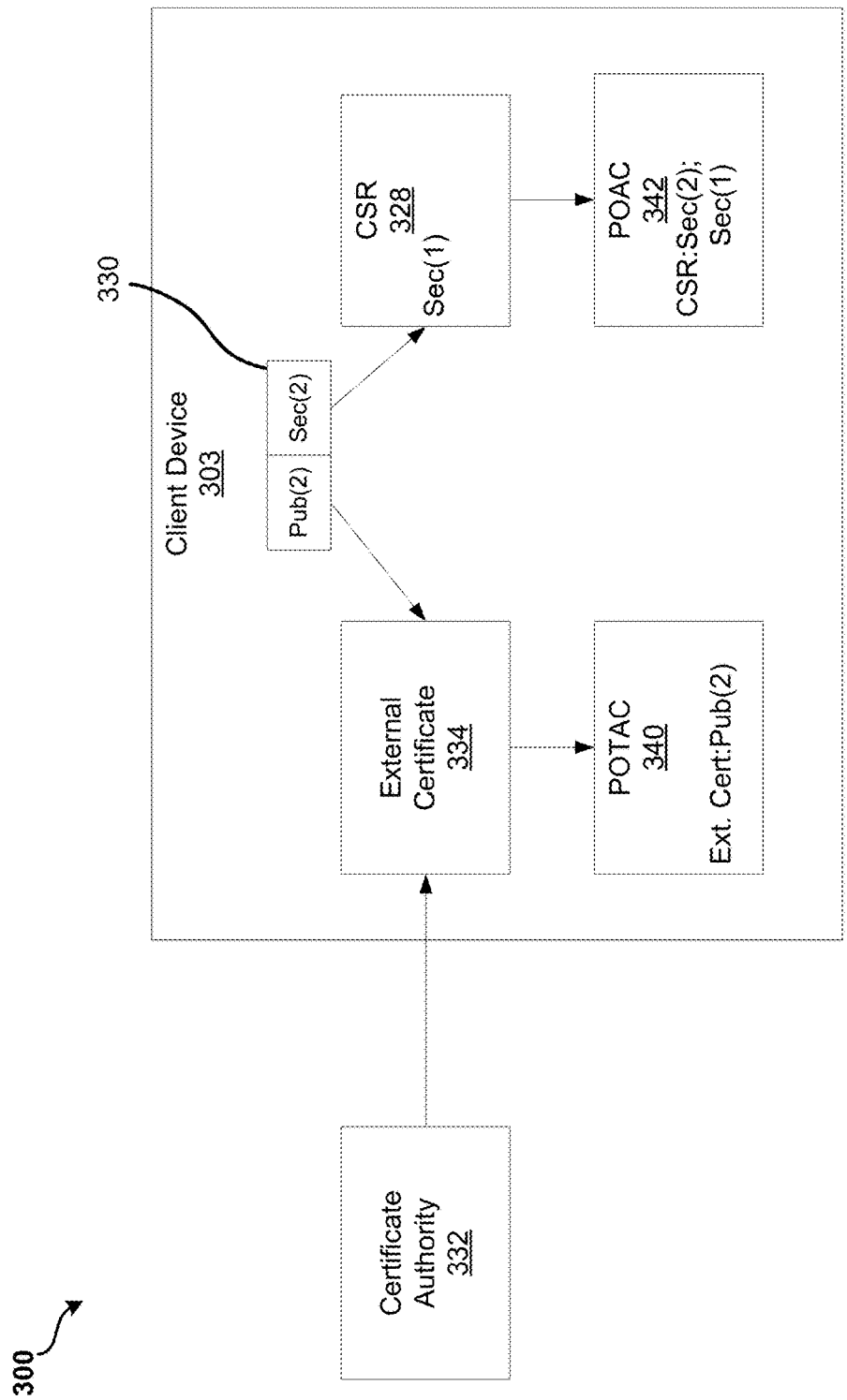

In FIG. 3C, the client device 303 may access (or generate) admin keys 330. The admin keys 330 may be a public-private key pair and include a public key (Pub(2)) and a secret key (Sec(2)). Additionally, the client device 303 may access an external certificate 334 from a certificate authority 332. The certificate authority 332 may be a third-party certificate authority for providing digital certificates as a source of truth for credentialling, etc. In some embodiments, the client device 303 may act as its own certificate authority. Then, the external certificate 334 may be a self-issued certificate. In any case, the external certificate 334 may not be linked in any way to the CSP 302, the HSM 310, and/or the secure partition 312.

The client device 303 may digitally sign the external certificate with the Pub(2) of the admin keys 330 to generate the POTAC 340. The POTAC 340 may therefore include some or all of the external certificate 334 and admin keys. The POTAC 340 may accordingly be a certificate whose source of truth is based outside of the CSP 302, the HSM 310, and/or the secure partition 312. Any subsequent authentication using the POTAC 340 as a source of truth may therefore be independent of the CSP 302.

The client device 303 may also digitally sign the CSR 328 with the Sec(2) of the admin keys 330 to generate a POAC 342. The POAC 342 may therefore include the CSR 328 signed with the Sec(1) of the HSM keys 316 and the Sec(2) of the admin keys 330. The POAC 342 may therefore be used to verify and/or authenticate the POTAC 340 as being associated with the client device 303 and/or the secure partition 312, as described below.

Figure 3D:
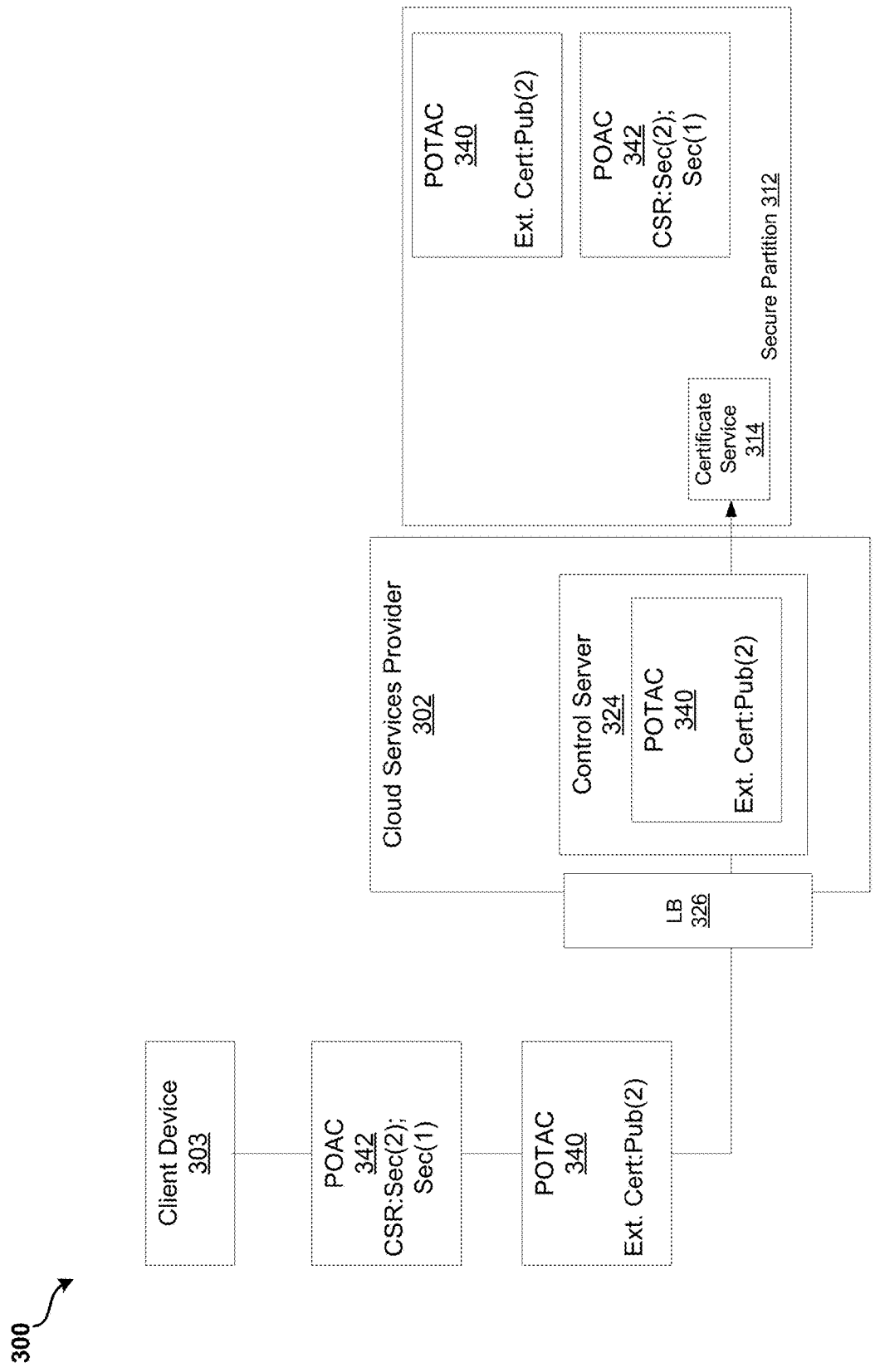

In FIG. 3D, the client device 303 may transmit the POTAC 340 and the POAC 342 to the certificate service 314 on the secure partition 312. The client device 303 may transmit the POTAC 340 and the POAC 342 via the LB 326 and the control server 324, as shown in FIG. 3D. Additionally or alternatively, the client device 303 may transmit the POTAC 340 and the POAC 342 via the HSM service 306 (e.g., in FIG. 3B). The certificate service 314 may store the POTAC 340 and the POAC 342 on the secure partition 342. The certificate service 314 may use the POAC 342 to associate the client device 303 (and/or the user thereof) with the secure partition 312. For example, the POAC 342 may include the CSR 318 signed with the Sec(2) of the admin keys 330 and the Sec(1) of the HSM keys 316. The POTAC 340 may be signed with the Pub(2) of the admin keys 330. Thus, the certificate service 314 may verify the POAC 342 and the POTAC 340 using the admin keys 330. Once the POTAC 340 and the POAC 342 are verified by the certificate service 314, the secure partition 312 may be considered "owned" by the client device 303. Any subsequent access by a user may therefore be granted based at least in part on the POTAC 340 and/or the POAC 342. However, neither of the POTAC 340 nor the POAC 342 may be associated with or controlled by the CSP 302. Thus, the source of truth and access control may lie solely with the client device 303 (and/or the user(s) thereof).

The POTAC 340 may also be stored on the control server 324. In some embodiments, the POTAC 340 may be stored elsewhere, but be accessible by the control server 324. As the control server 324 is associated with the client device 303 and/or the secure partition 312, only the client device 303 may access the control server 324. However, the POTAC 340 may only include the Pub(2) of the admin keys 330, not the Sec(2) of the admin keys 330. Even if the CSP 302 (or some other party) could access the control server 324, the CSP 302 may therefore only access Pub(2) of the admin keys 330. Thus, the CSP 302 may not be able to authenticate a subsequent user, as the Sec(2) may be required to verify the authenticity of an access request (e.g., verification may require the Pub(2) and the Sec(2) of the admin keys). Thus, the CSP 302 may be removed from all control and access to the secure partition 312.

Figure 4:
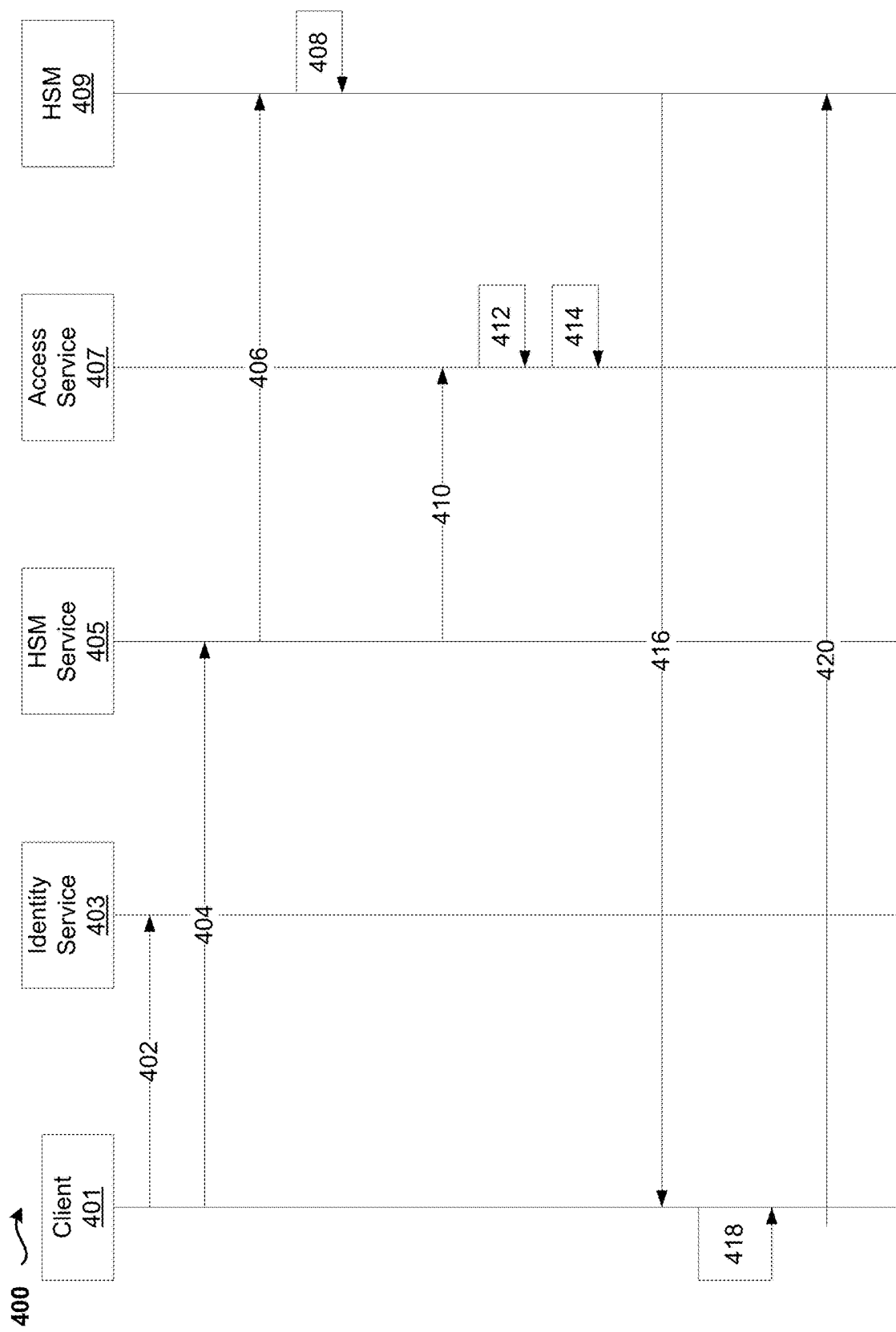
FIG. 4 illustrates a process flow of a process for provisioning and providing access to a secure partition on an HSM, according to certain embodiments.

FIG. 4 illustrates a process flow of a process 400 for provisioning and providing access to a secure partition on an HSM 409, according to certain embodiments. The process 400 may be performed by some or all of the systems described herein, such as the systems 100-300, described in relation to FIGS. 1-3D.

At 402, a client 401 may transmit an authentication request to an identity service 403 of a CSP (e.g., the CSP 302). The authentication request may include credentials such as a username and password, device ID, and other such information. The client may be similar to the client device 303 in FIGS. 3A-3D. The client 401 may be associated with a tenant of the CSP. The client 401 may be an administrator of the tenant, responsible for administering one or more cloud resources within the tenancy (e.g., virtual machines, secure environments, secure partitions, etc.). The client 401 may therefore have the authority to configure a secure partition and/or control subsequent access.

After authenticating with the identity service 403, at 404, the client 401 may transmit a request for a secure partition to an HSM partition 405. The HSM service 405 may be similar to the HSM service 306. The HSM service 405 may include one or more APIs used to call other services of the CSP in order to provision and otherwise manage an HSM (or partition thereof). The request may include information identifying one or more regions, data to be included on the secure partition, and other such information.

At 406, the HSM service 405 may send one or more commands to the HSM 409. The one or more commands may be used by the HSM 409 to provision a secure partition. Then, at 408, the HSM 409 may provision the secure partition. For example, the one or more commands may cause services (such as the certificate service 314) to be instantiated on the secure partition. The one or more commands may also cause various applications to be installed and/or executed on the secure partition. The one or more commands may cause one or more keys associated with the client 401 to be loaded on the secure partition. The one or more commands and/or the services may also cause a public-private key pair to be generated on the secure partition (e.g., the HSM keys 316). One of ordinary skill in the art would recognize many different possibilities.

At 410, the HSM service 405 may transmit some or all of the information included in the request for a secure partition to an access service 407. The access service 407 may include one or more APIs used to call other services of the CSP in order to provide secure access to the secure partition for the client 401. The access service 407 may be a separate service of the CSP, or the access service 407 may be included as part of the HSM service 405 (i.e., the HSM service 306).

At 412, the access service 407 may generate and/or provision a control server. The control server may be a hardware and/or software component configured to perform certain access functions for the secure partition and/or the client 401. The HSM 409 and the control server may be located on a single physical machine (e.g., a server in a data center). Because the control server may be located on the same machine as the HSM 409, higher security may be achieved. For example, the control server may be used, in part, to authenticate users for subsequent access to the secure partition. The authentication may therefore take place on the same machine as the HSM 409, without additional network exposure.

At 414, the access service 407 may generate one or more load balancers for accessing the control server and/or the secure partition. The load balancer(s) may be configured to provide access to the control server without the intervention or involvement of the CSP (or services thereof). In some embodiments, the load balancer(s) may be identified by a public IP address. The load balancer(s) may therefore be locatable from a public network (e.g., the internet). The load balancer(s) may also include one or more ports that are not publicly available or discoverable. Each of the ports may correspond to a particular partition. For example, the HSM 409 may include the secure partition. The load balancer(s) may therefore include a port linked to the secure partition. Any traffic directed towards the secure partition may pass through the port. A replica partition on another HSM may be linked to another port of the load balancer(s). Any traffic directed towards the replica partition may pass through the other port. Thus, without knowing the appropriate port, a subsequent user may not access the appropriate control server, let alone the secure partition.

At 416, the HSM 409 (and/or the HSM service 405) may transmit a CSR to the client 401. The CSR may be similar to the CSR 318 in FIG. 3A. The CSR may be signed with a public key of the HSM keys. The CSR may be generated with the certificate service.

At 418, the client 401 may generate a POTAC and a POAC, as described above in relation to FIG. 3C. The POTAC may have no involvement of the CSP or related services, instead being generated by an outside certificate authority (and/or the client 401). Thus, the POTAC may be an external source of truth, with no connection to the CSP. The POAC, on the other hand, may be linked to the secure partition of the HSM 409. Thus, the POAC may be used to verify the client device 401 and the secure partition, linking the two and indicating ownership of the secure partition by the client 401 (and/or the tenant associated therewith).

At 420, the client 401 may transmit the POTAC and the POAC to the secure partition on the HSM 409. The POTAC and the POAC may be stored on the secure partition by the certificate service (or some other service on the secure partition). The certificate service may utilize the POTAC and/or the POAC to validate the client 401, such that the client 401 claims ownership of the secure partition.

Figure 5:
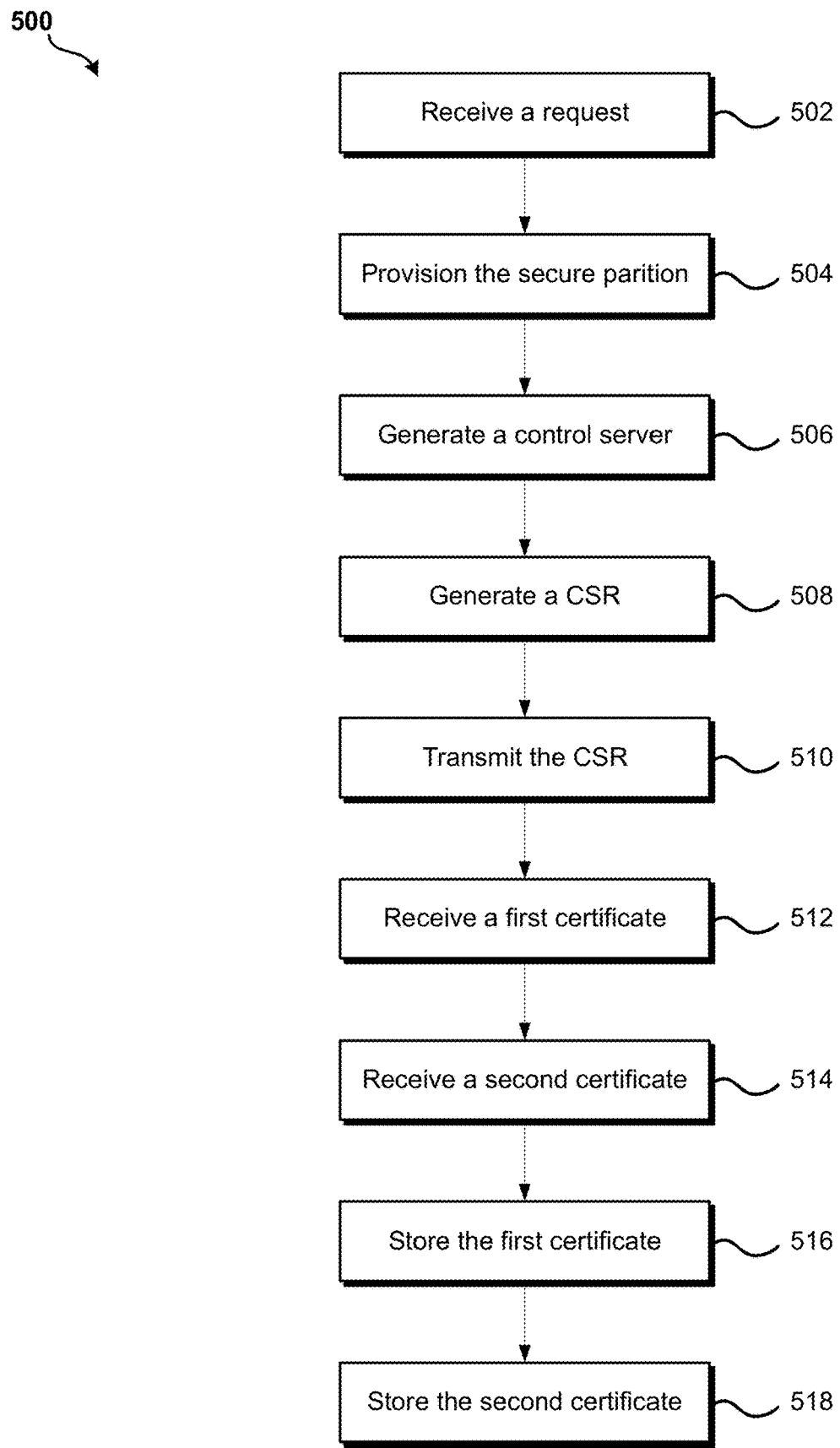
FIG. 5 illustrates a flowchart of a method for provisioning and providing access to a secure partition on an HSM, according to certain embodiments.

FIG. 5 illustrates a flowchart of a method 500 for provisioning and providing access to a secure partition on an HSM, according to certain embodiments. The method 500 may be performed by some or all of the system described herein, including the systems 100-300 in FIGS. 1-3D. The steps of the method 500 may be performed in a different order than is presented and/or may be combined with other steps. In some embodiments, some steps may be skipped altogether.

At 502, the method 500 may include receiving, by a hardware security module (HSM) service of a computing system, a request for a secure partition on an HSM from a client device. The client device may be similar to the user device 102 and/or the client device 303. The client device may be physical or virtual machine(s) associated with an organization. For example, the client device may be a laptop, server, desktop etc. Additionally or alternatively, the client device may be a virtual machine in a private cloud network (PCN) associated with the organization. The PCN may be hosted by a CSP, by the organization, and/or by a third party. The CSP may provide cloud services to one or more organizations (e.g., customers, tenants, etc.). The CSP may provide virtual machines, cloud environments, PCNs, cloud-based storage, and other such cloud resources.

The computing system may be any number of physical and/or virtual machines, configured to provide various services to tenants of the CSP. The services may include identity services, key management services, provisioning of cloud resources, processing solutions, application instantiation, and/or other cloud service. One such service may be the HSM service. The HSM service may include one or more application programming interfaces (APIs) configured to provide access to and manage HSM partitions. For example, the HSM service may identify available partitions on an HSM and provision an available HSM partition for use by a tenant (e.g., the client device).

At 504, the method 500 may include provisioning, by the HSM service of the computing system, the secure partition on the HSM associated with the computing system. The HSM service may transmit a provisioning request to the secure partition. The provisioning request may include one or more commands that cause one or more services, applications, and/or data sets to be instantiated or otherwise stored on the secure partition.

At 506, the method 500 may include generating, by the HSM service of the computing system, a control server and a load balancer (LB), each configured to provide access to the secure partition on the HSM to the client device. The control server may be similar to the control server 112 and/or the control server 324. The control server may be a hardware and/or software component configured to manage connection(s) between the client device and the HSM. The control server may be physically and/or logically connected to a physical machine hosting the HSM. The control server may be associated with the client device, meaning that the control server only communicates with a single tenant. In some embodiments, the control server may be associated with the secure partition of the HSM. If replica partitions are provisioned on other HSMs, each replica partition be associated with a respective control server.

The LB may be configured to direct traffic between the client device (and/or other associated devices) and the secure partition. The LB may be configured to transmit data via the control server. The LB may be a private LB, with a public IP address. Only the client device (and/or other associated devices) may access the LB, limiting access and providing more security. Additionally or alternatively, the LB may only be accessible via a private endpoint of a PCN associated with the client device. One of ordinary skill in the art would recognize many different possibilities and configurations.

At 508, the method 500 may include generating, by a certificate service executed on the secure partition on the HSM associated with the computing system, a certificate signing request (CSR). The CSR may be signed by the certificate service using a public key of a first public private key pair. The first public private key pair may be similar to the HSM keys 316. The CSR may be a request for a certificate used to authenticate the client device. Even though the certificate service was instantiated on the secure partition by the CSP, the CSP may have no access to the instance of the certificate service. In other words, even though the CSP may control the HSM and instantiate the certificate service, the CSP may have no control over anything within the secure partition.

At 510, the method 500 may include transmitting, by the certificate service of the secure partition on the HSM associated with the computing system, the CSR to the client device. The CSR may be transmitted by the HSM service, and/or may be transmitted by the control server and LB.

At 512, the method 500 may include receiving, from the client device and by the certificate service of the secure partition, a first certificate. The first certificate may be similar to the POAC 342. The first certificate comprising the secret key of the first public private key pair (e.g., Sec(1) of the HSM keys 316) and a private key of a second public private key pair (e.g., Sec(2) of the admin keys 330). The first certificate may therefore be used to authenticate the client device and associate the client device (i.e., the tenant) with the secure partition.

At 514, the method 500 may include receiving, by the certificate service of the secure partition, a second certificate generated by an external certificate authority and signed with a public key of the second public private key pair (e.g., Pub(2) of the admin keys 330). The second certificate may be similar to the POTAC 340. The certificate service may verify the POAC and the POTAC using the admin keys. Once the POTAC and the POAC are verified by the certificate service, the secure partition may be considered "owned" by the client device. Any subsequent access by a user may therefore be granted based at least in part on the POTAC and/or the POAC. However, neither of the POTAC nor the POAC may be associated with or controlled by the CSP. Thus, the source of truth and access control may lie solely with the client device 303 (and/or the user(s) thereof).

At 516, the method 500 may include storing, by the certificate service of the secure partition, the first certificate and the second certificate on the secure partition. Thus, the certificate service may utilize the first certificate and/or the second certificate (e.g., the POTAC and the POAC) to verify subsequent access requests.

At 518, the method 500 may include storing, by the computing system, the second certificate (e.g., the POTAC) in a location accessible by the control server. The control server may use the POTAC as a certificate authority, verifying a leaf certificate as genuine. The source of truth (e.g., the POTAC) may therefore be controlled solely by the client device (and related tenant). The CSP and/or the control server may not issue valid leaf certificates because the CSP does have access to the private key of the second public private key pair—the control server may only verify certificates as being issued by the client device. Thus, the CSP may not access the secure partition itself, nor grant access to any other party.

In some embodiments, the method 500 may include generating, by the HSM service of the computing system, one or more replicas of the secure partition on one or more other HSMs. The one or more replicas may be associated with respective regions. The method 500 may also include configuring, by the HSM service of the computing system, the control server and load balancer to provide access to at least one of the one or more replicas of the secure partition.

FIGS. 3E-3G illustrates the system 300 for providing secure access to the secure partition 312, according to certain embodiments. A user device 332 may be associated with the client device 303. The user device 332 may be a physical or virtual machine, associated with the same tenant as associated with the client device 303. For example, the client device 303 may be associated with an administrator for the tenant. The user device 332 may be associated with a user for the tenant, to whom the administrator desires to give access to the secure partition 312.

To request access to the secure partition, the user device 332 may generate or access client keys 344. The client keys 344 may be a public-private key pair with a public key (Pub(3)) and a secret key (Sec(3)). The user device 332 may generate a client certificate request (CCR) 346, signed with the Pub(3) of the client keys 344. The user device 332 may transmit the CCR 346 to the client device 303. The client device 303 may authenticate the user device 332, and sign the CCR with the Sec(2) of the admin keys 330 to generate the leaf certificate 348. The leaf certificate 348 may additionally or alternatively be generated based on the POTAC 340.

In FIG. 3F, the user device 332 may transmit the leaf certificate 348 and an access request 350 to the control server 324. Because the client device 303 has already claimed ownership of the secure partition 312, the CSP 302 and services thereof (e.g., the HSM service 306, the KMS 304, etc.) may no longer be involved in accessing the secure partition 312. Instead, the user device 332 may transmit the leaf certificate 348 and the access request 350 to the control server 324 via the load balancer 326.

The access request 350 may identify the secure partition 312, the load balancer 326 (e.g., by identifying an associated IP address), and other information to access the secure partition 312. The access request 350 may also indicate a port of the load balancer 326. For example, the tenant associated with the user device 332 may have multiple partitions (e.g., in different regions), each associated with a different port of the load balancer 326. Thus, the access request 350 may identify a particular port associated with a desired region or partition.

The control server 324 may verify the leaf certificate 348 using the POTAC 340. For instance, the control server 324 may utilize the Pub(2) of the admin keys 330 to verify some or all of the leaf certificate 348 and/or the access request 350. Because the leaf certificate may be signed with the Sec(2) of the admin keys, the control server 324 may be able to verify that the leaf certificate 348 was issued by the client device 303. In this way, the control server 324 may use the POTAC 340 as a certificate authority, verifying the leaf certificate 348 as genuine. The source of truth (e.g., the POTAC 340) may therefore be controlled solely by the client device 303 (and related tenant). The CSP 302 may not issue valid leaf certificates because the CSP 302 does not have access to the Sec(2) of the admin keys 330—the control server 324 may only verify certificates as being issued by the client device. Thus, the CSP 302 may not access the secure partition itself, nor grant access to any other party.

The control server 324 may then establish a first connection (as described in FIG. 3G) between the secure partition 312 and the user device 303. Then, the user device 332 may transmit the leaf certificate 348 and/or the access request 350 to the secure partition 312. The certificate service 314 may then verify the leaf certificate 348 again, using the POTAC 340. The certificate service 314 may utilize a similar process as described above to verify the leaf certificate 348. A second, secure connection may then be generated within the first connection.

In FIG. 3G, the user device 332 may be connected to the secure partition 312 via first TLS connection 352 and a second TLS connection 354. Returning to FIG. 3F, the control server 324 may verify the leaf certificate 348 and/or the access request 350 using the POTAC 340. After this verification, the control server 324 may establish a mutual TLS connection (e.g., the first TLS connection 352). The first TLS connection 352 may provide a secure connection between the user device 332 and the secure partition 312, but data transmitted via the first TLS connection 352 may still be visible to the control server 324. In other words, the data transmitted via the first TLS connection 352 may be visible by the CSP 302. This may not provide a desired level of security, as the CSP 302 potentially has the ability to observe the data within the first TLS connection 352.

Thus, a second verification may be performed by the certificate service 314 on the secure partition 314. The certificate service 314 may verify the leaf certificate 348 and/or the access request 350 using the POTAC 340 and/or the POAC 342 stored on the secure partition 312. Once the leaf certificate 348 and/or the access request 350 is verified by the certificate service 314, the second TLS connection 354 may be created within the first TLS connection 352. The second TLS connection 354 may be generated by a service instantiated on the secure partition and/or the user device 332. Because the second TLS connection 354 is within the first TLS connection 352, the control server 324 (and/or any other service/module/etc. of the CSP 302) may not be able to observe any data transmitted via the second TLS connection 354. The control server 324 may be able to determine that a second TLS connection exists within the first TLS connection 352, but not be able to determine whether any data is being passed through the second TLS connection 354. Thus, the user device 332 may be able to securely access the secure partition 312 without the involvement of the CSP 302. The CSP 302 may not even be able to determine whether any data is being passed transmitted to and from the user device 332 and the secure partition 312.

Figure 6A:
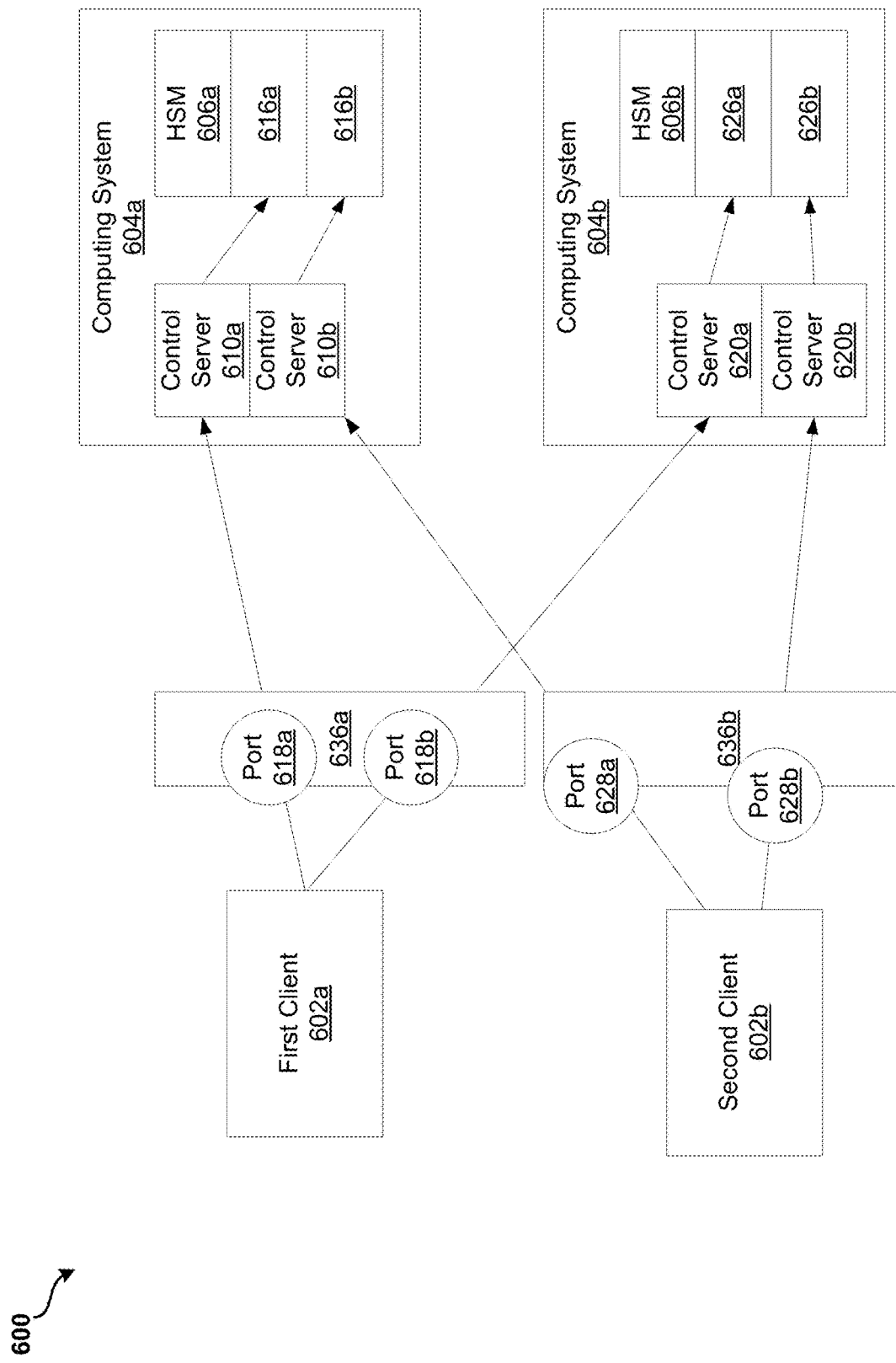
FIG. 6A illustrates a system with load balancers and control servers and for accessing HSM partitions, according to certain embodiments.

FIG. 6A illustrates a system 600 with load balancers 626a-b and control servers 610a-b and 620a-b for accessing HSM partitions 616a-b and 626a-b, according to certain embodiments. The system 600 may be similar to some or all of the systems 100-300, described in relation to FIGS. 1-3G. The system 600 may include clients 602a-b, computing systems 604a-b, and the load balancers (LBs) 626a-b. The computing system 604a-b may include HSMs 606a-b, respectively. The computing system 604a may include control servers 610a-b, and the computing system 604b may include control servers 620a-b. The clients 602a-b may be similar to the client device 303 and/or the user device 332. The client device 602a may be associated with a first tenant of a CSP (e.g., the CSP 302), and the client device 602b may be associated with a second tenant of the CSP. As each tenant may be different, the first and second tenants may require separate partitions on an HSM, yet may both need access to their respective HSMs in different regions.

The computing systems 604a-b may be associated with the CSP. The computing systems 604a-b may be one or more physical and/or virtual machines (e.g., servers) in a data center, etc. The computing system 604a may be associated with a first region, and the computing system 604b may be associated with a second region. The HSMs 606a-b may be PCI-e devices, connected to a physical machine in a respective region. Each of the HSMs 606a-b may be divided into partitions. The HSM 606a may include partitions 616a and 616b. The partition 616a may be associated with the first client 602a (e.g., the first tenant), and the second partition 616b may be associated with the second client 602b (e.g., the second tenant). Although associated with different tenants, the partitions 616a-b may be included in a single HSM (i.e., the HSM 606a). The HSM 606b may include partitions 626a and 626b. The partition 626a may be associated with the first client 602a (e.g., the first tenant), and the second partition 626b may be associated with the second client 602b (e.g., the second tenant). Although associated with different tenants, the partitions 626a-b may be included in a single HSM (i.e., the HSM 606b).

The HSMs 606a-b (and/or partitions thereof) may be only accessible by a respective control server. The control servers 610a-b and 620a-b may be hardware and/or software components configured to manage connection(s) between the user devices and the HSM partitions. The control servers 610a-b and 620a-b may be physically and/or logically connected to a physical machine hosting the HSMs. The computing system 604a may include the control server 610a and the control server 610b. The control server 610a may be configured to authenticate access requests and leaf certificates to provide access to the partition 616a for the first client 602a, as described in FIGS. 3E-3G. The control server 610b may be configured to provide access to the partition 616b for the second client 602b. Similarly, the computing system 604b may include the control server 620a and the control server 620b. The control server 620a may be configured to authenticate access requests and leaf certificates to provide access to the partition 626a for the first client 602a, as described in FIGS. 3E-3G. The control server 620b may be configured to provide access to the partition 626b for the second client 602b.

The LB 626a may include ports 618a-b. The LB 626a may include a public IP address, visible to a public network (e.g., the internet). The ports 618a-b, however, may not be visible to the public and may be only accessible to an associated tenant (here, the first client 602a). Thus, if the first client 602a desires to connect to the partition 616a, an access request may identify the port 618a. The access request may then be direct to the control server 610a, where verification and access may be granted (see FIGS. 3F-G). Similarly, if the first client 602a desires to connect to the partition 626a, the access request may identify the port 618b.

The LB 626b may include ports 628a-b. The LB 626b may include a public IP address, visible to a public network (e.g., the internet). The ports 628a-b, however, may not be visible to the public and may be only accessible to an associated tenant (here, the second client 602b). Thus, if the second client 602b desires to connect to the partition 616b, an access request may identify the port 628a. The access request may then be direct to the control server 610b, where verification and access may be granted (see FIGS. 3F-G). Similarly, if the second client 602b desires to connect to the partition 626b, the access request may identify the port 628b.

Figure 6B:
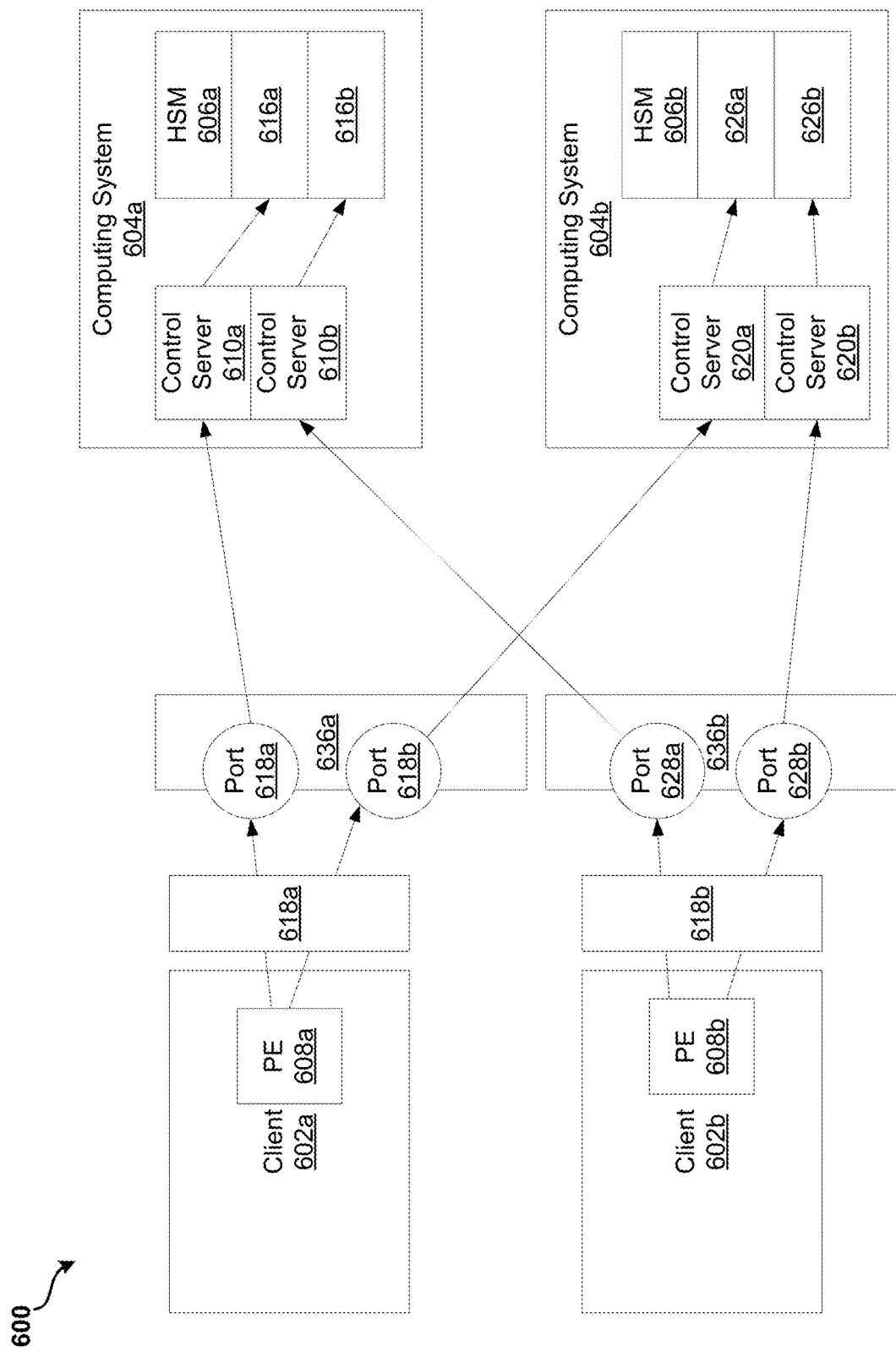
FIG. 6B illustrates the system with private endpoints, load balancers, and control servers for accessing HSM partitions, according to certain embodiments.

FIG. 6B illustrates the system 600 with private endpoints (PEs) 608a-b, load balancers 626a-b and control servers 610a-b and 620a-b for accessing HSM partitions 616a-b and 626a-b, according to certain embodiments. In the example shown in FIG. 6B, the clients 602a-b may each include a respective private endpoint 608a-b. The clients 602a-b may be implemented on respective PCNs, each associated with a respective tenant. To access a cloud resource, each PCN may include a private endpoint, allowing data to be transmitted to and from the PCN without exposing any of the components of the system 600 to a public network. Instead, data may be transmitted from the private endpoints 608a-b to a respective endpoint service 618a-b.

The respective endpoint services 618a-b may perform DNS services and other services, resolving addresses in order to direct data to and from an intended recipient. For example, the client 602a may transmit an access request to access the partition 616a. The client 602a may transmit the access request to the PE 608. The PE 608 may then transmit the access request to the endpoint service 618a. The endpoint service 618 may resolve an address (e.g., an IP address), and determine that the access request should be routed to the LB 636a and the port 618a. The access request may then be directed to the control server 610a and the partition 616a. A similar process may be followed for requests from the client 602b, using the PE 608b and the endpoint service 618b.

Figure 7:
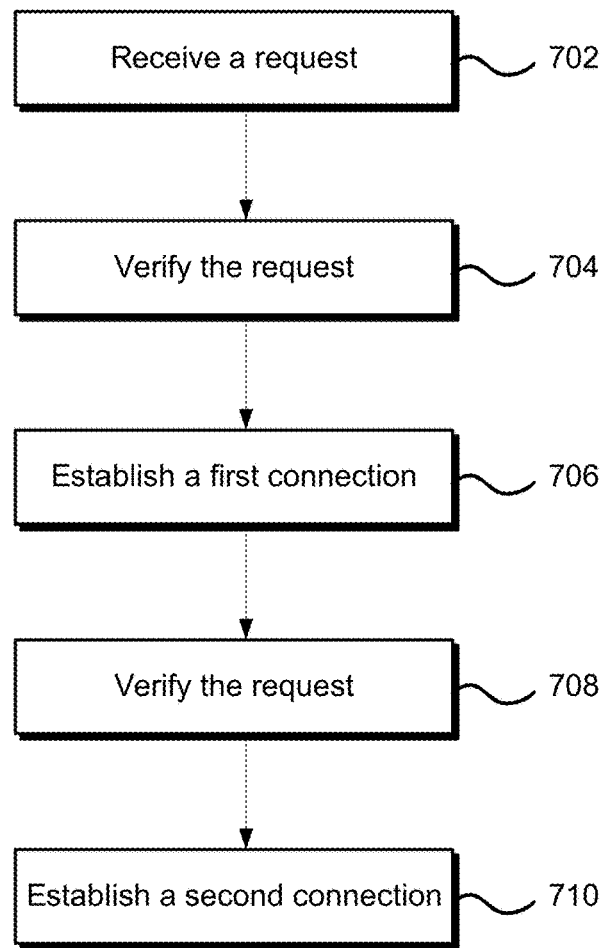
FIG. 7 illustrates a flowchart of a method for provisioning and providing access to a secure partition on an HSM, according to certain embodiments.

FIG. 7 illustrates a flowchart of a method 700 for provisioning and providing access to a secure partition on an HSM, according to certain embodiments. The method 700 may be performed by some or all of the system described herein, including the systems 100-300 in FIGS. 1-3G. The steps of the method 700 may be performed in a different order than is presented and/or may be combined with other steps. In some embodiments, some steps may be skipped altogether.

At 702, the method 700 may include receiving, by a control server of a computing system, a request for access to a HSM partition from a client device. The request may include a leaf certificate signed with a public key associated with a user and a secret key associated with the client device. The control server may be similar to the control server 324. The client device may be similar to the user device. The public key associated with a user may be similar to the Pub(3) of the client keys 344. The secret key associated with the client device may be similar to the Sec(2) of the admin keys 330. The leaf certificate may be based on a client certificate request from the client device, and/or based on the POTAC.

At 704, the method 700 may include verifying, by the control server of the computing system, the request using the leaf certificate and a trust anchor certificate (e.g., the POTAC) signed with a public key associated with the client device (e.g., the Pub(2) of the admin keys 330). The control server may verify the leaf certificate using the POTAC. For instance, the control server may utilize the Pub(2) of the admin keys to verify some or all of the leaf certificate and/or the access request. Because the leaf certificate may be signed with the Sec(2) of the admin keys, the control server may be able to verify that the leaf certificate was issued by the client device. In this way, the control server may use the POTAC as a certificate authority, verifying the leaf certificate as genuine. The source of truth (e.g., the POTAC) may therefore be controlled solely by the client device (and related tenant). The CSP cannot issue valid leaf certificates because the CSP may not have access to the Sec(2) of the admin keys the control server may only verify certificates as being issued by the client device. Thus, the CSP may not access the secure partition itself, nor grant access to any other party.

In response to verifying the leaf certificate, at step 706, the method 700 may include establishing, by the control server of the computing system, a first connection between the HSM partition and the client device. The control server may establish a mutual TLS connection (e.g., the first TLS connection 352). The first connection may provide a secure connection between the client device and the secure partition, but data transmitted via the first connection may still be visible to the control server.

At 708, the method 700 may include verifying, by a service executed on the HSM partition, the request using the leaf certificate and an authentication certificate stored on the HSM partition. For example, the certificate service may verify the leaf certificate and/or the access request using the POTAC and/or the POAC stored on the secure partition.

In response to verifying the request, the leaf certificate and an authentication certificate stored on the HSM partition, at 710, the method 700 may include establishing, by the computing system, a second connection (e.g., the second TLS connection 354) between the client device and the HSM partition such that the computing system is isolated from the second connection. For example, once the leaf certificate and/or the access request is verified by the certificate service, a second connection may be created within the first connection. The second connection may be generated by a service instantiated on the secure partition and/or the client device. Because the second connection is within the first connection, the control server (and/or any other service/module/etc. of the CSP) may not be able to observe any data transmitted via the second connection.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
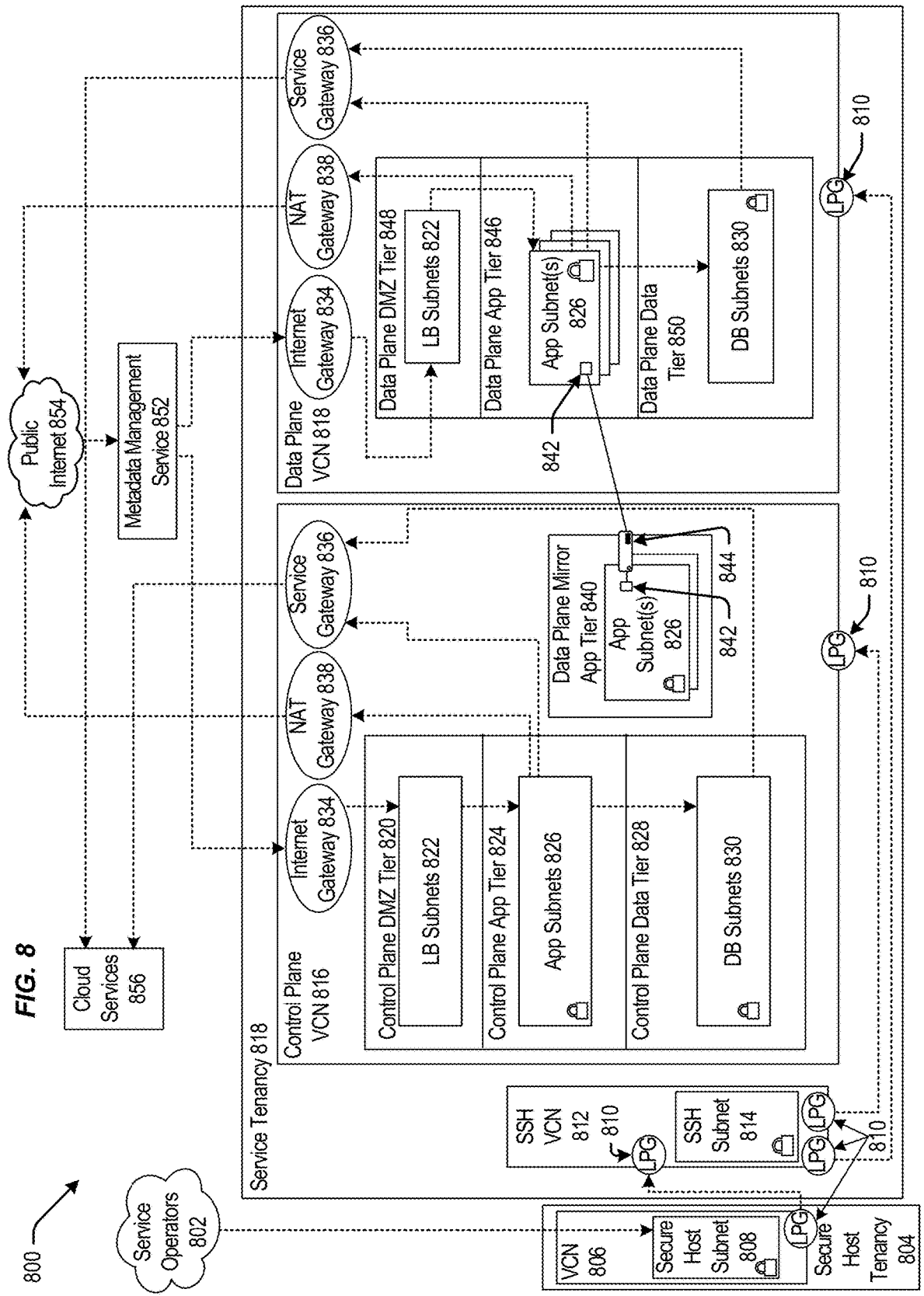
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively coupled to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
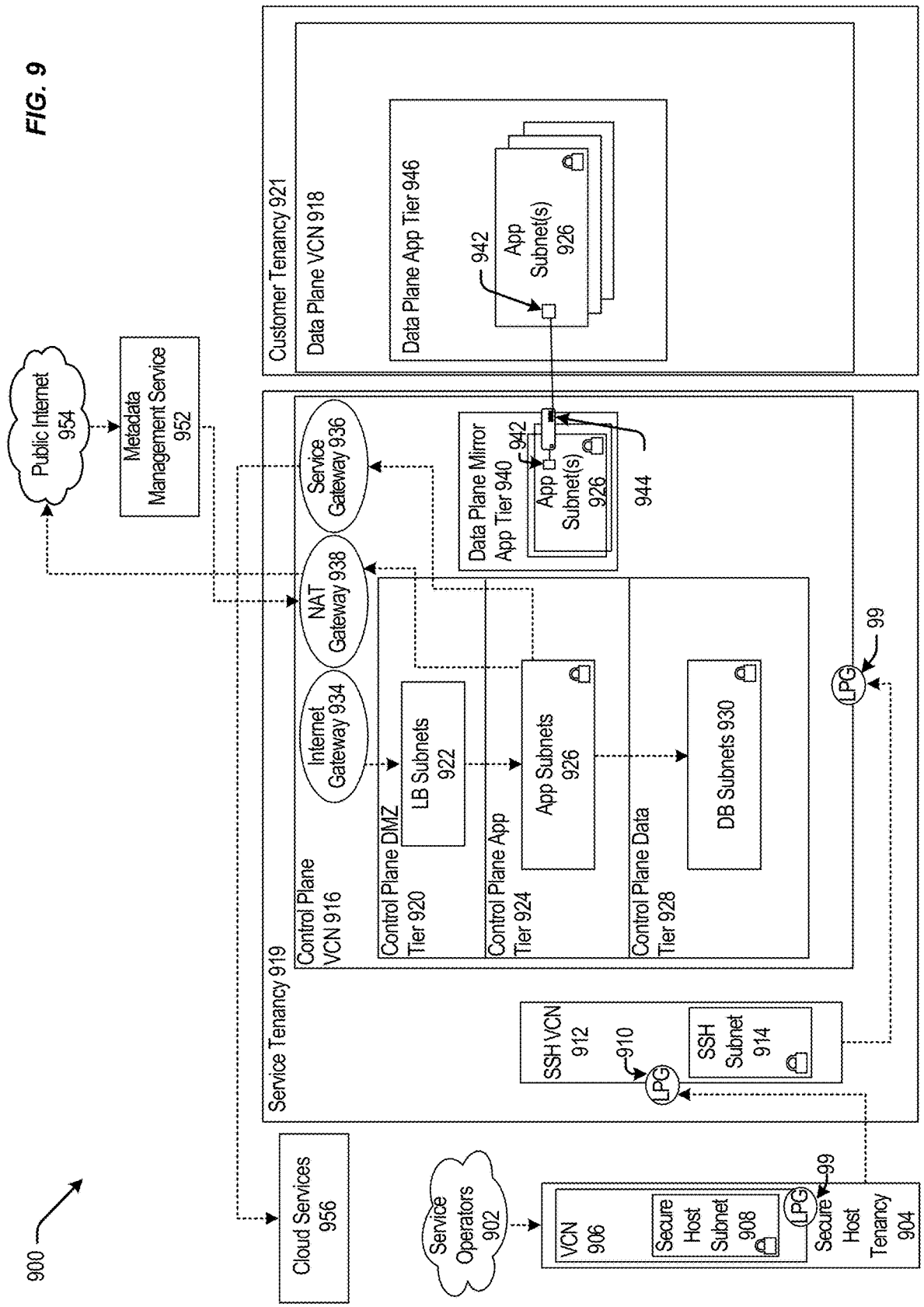
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively coupled to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
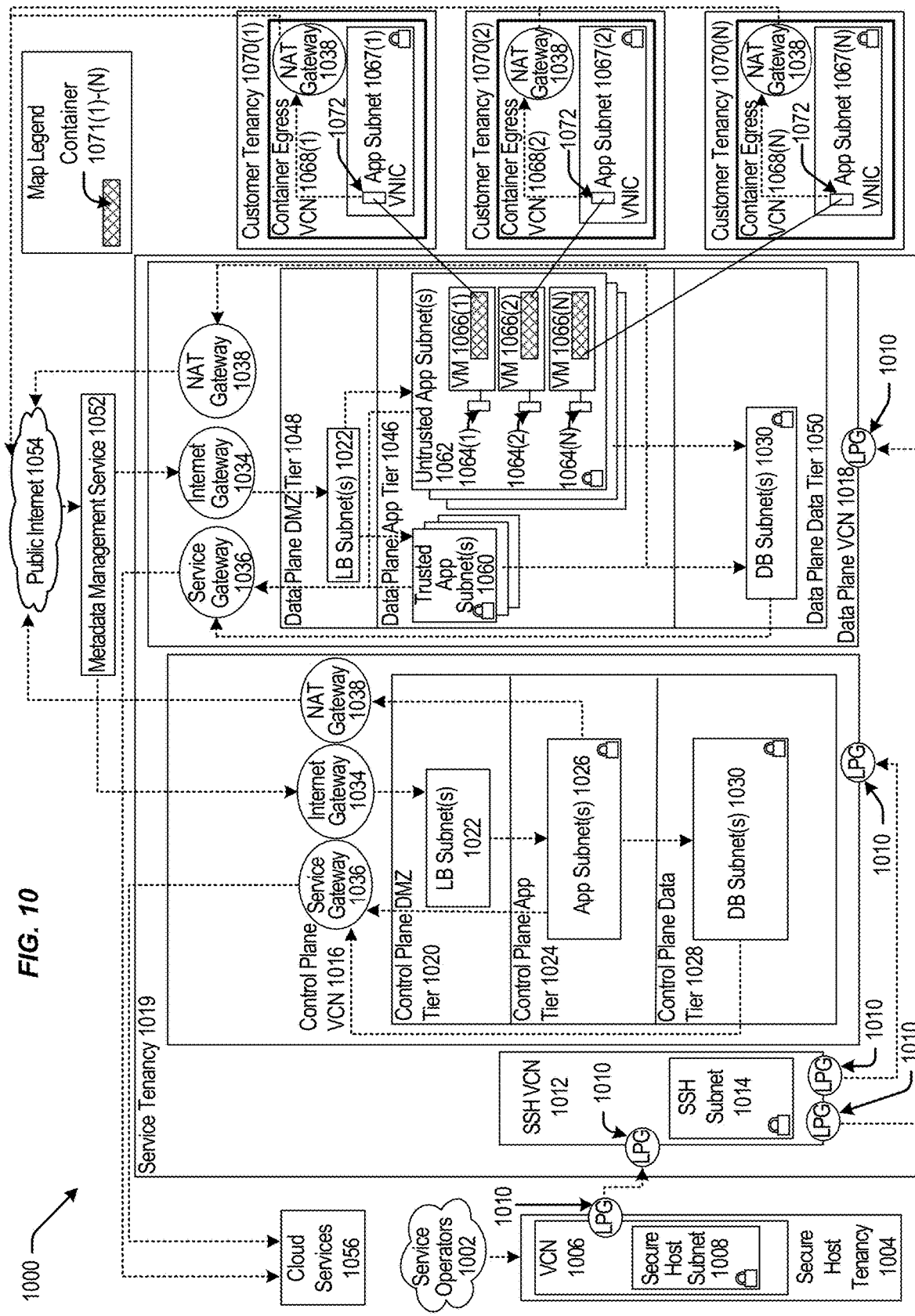
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively coupled to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
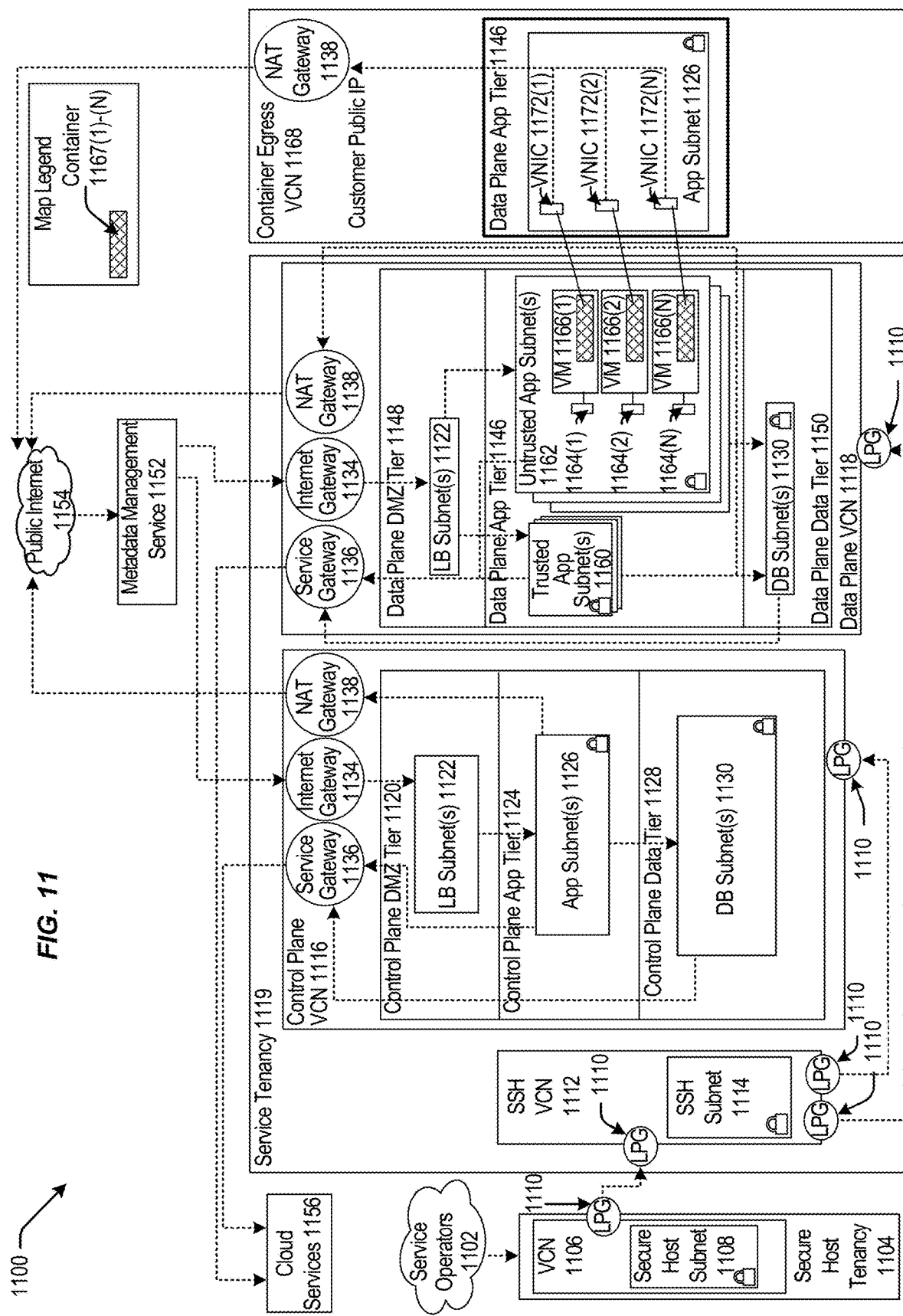
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively coupled to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
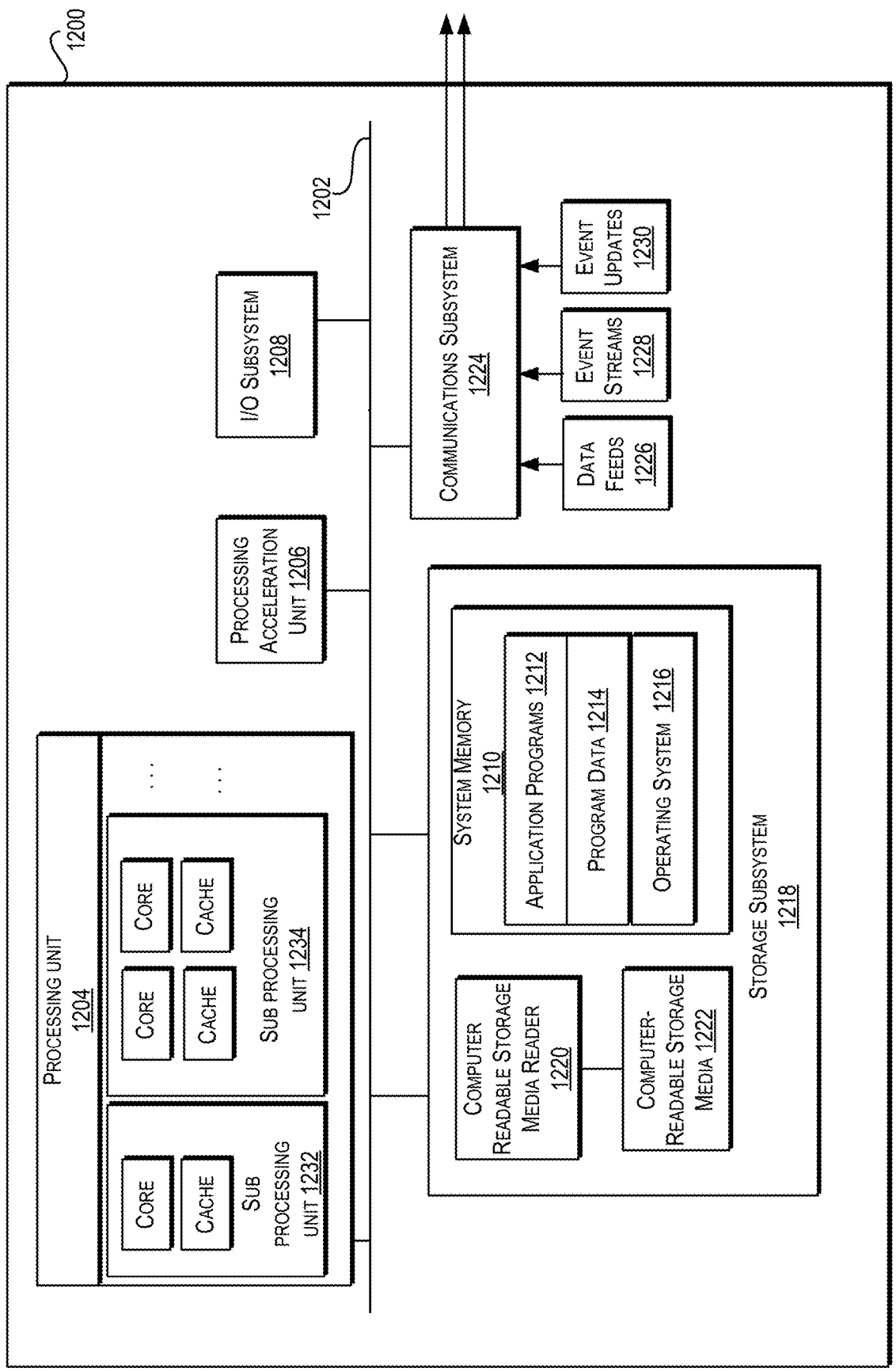
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1204 provide the functionality described above. Storage subsystem 1218 may also provide a repository for storing data used in accordance with the present disclosure.

As depicted in the example in FIG. 12, storage subsystem 1218 can include various components including a system memory 1210, computer-readable storage media 1222, and a computer readable storage media reader 1220. System memory 1210 may store program instructions that are loadable and executable by processing unit 1204. System memory 1210 may also store data that is used during the execution of the instructions and/or data that is generated during the execution of the program instructions. Various different kinds of programs may be loaded into system memory 1210 including but not limited to client applications, Web browsers, mid-tier applications, relational database management systems (RDBMS), virtual machines, containers, etc.

System memory 1210 may also store an operating system 1216. Examples of operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1200 executes one or more virtual machines, the virtual machines along with their guest operating systems (GOSs) may be loaded into system memory 1210 and executed by one or more processors or cores of processing unit 1204.

System memory 1210 can come in different configurations depending upon the type of computer system 1200. For example, system memory 1210 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1210 may include a basic input/output system (BIOS) containing basic routines that help to transfer information between elements within computer system 1200, such as during start-up.

Computer-readable storage media 1222 may represent remote, local, fixed, and/or removable storage devices plus storage media for temporarily and/or more permanently containing, storing, computer-readable information for use by computer system 1200 including instructions executable by processing unit 1204 of computer system 1200.

Computer-readable storage media 1222 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Machine-readable instructions executable by one or more processors or cores of processing unit 1204 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a hardware security module (HSM) service of a computing system, a request for a secure partition on an HSM from a client device;
   provisioning, by the HSM service of the computing system, the secure partition on the HSM;
   generating, by the HSM service of the computing system, a control server and a load balancer, each configured to provide access to the secure partition on the HSM to the client device;
   generating, by a certificate service executed on the secure partition on the HSM associated with the computing system, a certificate signing request (CSR), the CSR signed by the certificate service using a public key of a first public private key pair;
   transmitting, by the certificate service of the secure partition on the HSM associated with the computing system, the CSR to the client device;
   receiving, from the client device and by the certificate service of the secure partition, a first certificate, the first certificate comprising the public key of the first public private key pair and a private key of a second public private key pair;
   receiving, by the certificate service of the secure partition, a second certificate generated by an external certificate authority and signed with a public key of the second public private key pair;
   storing, by the certificate service of the secure partition, the first certificate and the second certificate on the secure partition; and
   storing, by the computing system, the second certificate in a location accessible by the control server.

2. The method of claim 1, wherein the computing system and/or the HSM service is unable to access the secure partition after generating the control server.

3. The method of claim 1, wherein the HSM comprises a plurality of partitions.

4. The method of claim 1, further comprising:
   generating, by the HSM service of the computing system, one or more replicas of the secure partition on one or more other HSMs; and
   configuring, by the HSM service of the computing system, the control server and load balancer to provide access to at least one of the one or more replicas of the secure partition.

5. The method of claim 1, wherein the second public private key pair is associated with the client device.

6. The method of claim 1, wherein the load balancer is accessible by a private endpoint associated with the client device.

7. The method of claim 1, wherein the load balancer is accessible by a public IP address.

8. A system, comprising:
   one or more processors;
   a computer-readable medium comprising instructions that, when executed by the one or more processors cause the system to perform operations to:
   receive, by a hardware security module (HSM) service of a computing system, a request for a secure partition on an HSM from a client device;
   provision, by the HSM service of the computing system, the secure partition on an HSM associated with the computing system;
   generate, by the HSM service of the computing system, a control server and a load balancer, each configured to provide access to the secure partition on the HSM to the client device;
   generate, by a certificate module executed on the secure partition, a certificate signing request (CSR), the CSR signed by the certificate module using a public key of a first public private key pair;
   transmit, by the certificate module of the secure partition, the CSR to the client device;
   receive, from the client device and by the certificate module of the secure partition, a first certificate, the first certificate comprising the public key of the first public private key pair and a private key of a second public private key pair;
   receive, by the computing system, a second certificate generated by an external certificate authority and signed with a public key of the second public private key pair;
   store, by the certificate module of the secure partition, the first certificate and the second certificate on the secure partition; and
   store, by the computing system, the first certificate in a location accessible by the control server.

9. The system of claim 8, wherein the computing system and/or the HSM service is unable to access the secure partition after generating the control server.

10. The system of claim 8, wherein the HSM comprises a plurality of partitions.

11. The system of claim 8, wherein the second public private key pair is associated with the client device.

12. The system of claim 8, wherein the load balancer is only accessible by a private endpoint associated with the client device.

13. The system of claim 8, wherein the load balancer is only accessible by the client device.

14. A non-transitory computer-readable memory comprising instructions that, when executed by one or more processors, cause the one or more processors to perform operations comprising:

receiving, by a hardware security module (HSM) service of a computing system, a request for a secure partition on an HSM from a client device;

provisioning, by the HSM service of the computing system, the secure partition on the HSM associated with the computing system;

generating, by the HSM service of the computing system, a control server and a load balancer, each configured to provide access to the secure partition on the HSM to the client device;

generating, by a certificate service executed on the secure partition on the HSM associated with the computing system, a certificate signing request (CSR), the CSR signed by the certificate service using a public key of a first public private key pair;

transmitting, by the certificate service of the secure partition on the HSM associated with the computing system, the CSR to the client device;

receiving, from the client device and by the certificate service of the secure partition, a first certificate, the first certificate comprising the public key of the first public private key pair and a private key of a second public private key pair;

receiving, by the certificate service of the secure partition, a second certificate generated by an external certificate authority and signed with a public key of the second public private key pair;

storing, by the certificate service of the secure partition, the first certificate and the second certificate on the secure partition; and storing, by the computing system, the first certificate in a location accessible by the control server.

15. The non-transitory computer-readable memory of claim 14, wherein the computing system and/or the HSM service is unable to access the secure partition after generating the control server.

16. The non-transitory computer-readable memory of claim 14, wherein the HSM comprises a plurality of partitions.

17. The non-transitory computer-readable memory of claim 14, the operations further comprising:

generating, by the HSM service of the computing system, one or more replicas of the secure partition on one or more other HSMs; and configuring, by the HSM service of the computing system, the control server and load balancer to provide access to at least one of the one or more replicas of the secure partition.

18. The non-transitory computer-readable memory of claim 14, wherein the second public private key pair is associated with the client device.

19. The non-transitory computer-readable memory of claim 14, wherein the load balancer is only accessible by a private endpoint associated with the client device.

20. The non-transitory computer-readable memory of claim 14, wherein the load balancer is only accessible by the client device.

* * * * *